United States Patent
Tezuka et al.

(10) Patent No.: US 8,503,863 B2
(45) Date of Patent: Aug. 6, 2013

(54) IMAGE REPRODUCTION DEVICE, IMAGE REPRODUCTION METHOD, AND IMAGE REPRODUCTION PROGRAM

(75) Inventors: Tadanori Tezuka, Fukuoka (JP); Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 847 days.

(21) Appl. No.: 12/524,952

(22) PCT Filed: Dec. 2, 2008

(86) PCT No.: PCT/JP2008/003556
§ 371 (c)(1),
(2), (4) Date: Jul. 29, 2009

(87) PCT Pub. No.: WO2009/078132
PCT Pub. Date: Jun. 25, 2009

(65) Prior Publication Data
US 2010/0021129 A1 Jan. 28, 2010

(30) Foreign Application Priority Data
Dec. 18, 2007 (JP) .................................. 2007-325555

(51) Int. Cl.
*G11B 27/00* (2006.01)
(52) U.S. Cl.
USPC .......................................................... 386/278
(58) Field of Classification Search
None
See application file for complete search history.

(56) References Cited

U.S. PATENT DOCUMENTS
2006/0120692 A1* 6/2006 Fukuta ............................ 386/95

FOREIGN PATENT DOCUMENTS
| JP | 7-107437 | 4/1995 |
| JP | 3137813 | 4/1995 |
| JP | 2003-101957 | 4/2003 |
| JP | 2004-120278 | 4/2004 |
| JP | 2006-166193 | 6/2006 |

OTHER PUBLICATIONS
International Search Report issued Mar. 10, 2009 in the International (PCT) Application of which the present application in U.S. National Stage.

* cited by examiner

*Primary Examiner* — William C Vaughn, Jr.
*Assistant Examiner* — Daniel Tekle
(74) *Attorney, Agent, or Firm* — Wenderoth, Lind & Ponack, L.L.P.

(57) ABSTRACT

A disc device 11 stores (i) videos and still images, and (ii) for each video/still image, image information including an imaging time at which the video/still image was taken. A time management unit 16 manages a reference time in accordance with playback performed by a display control unit 14. When a reception unit receives, from a user, a switch instruction that causes an image switch to be performed, a search unit 17 refers to the image information pieces to search for (i) from among the videos, a video that was entirely/partially taken during time range Ta, and (ii) from among the still images, a still image that was taken during time range Tb, both of the time ranges Ta and Tb including the reference time. The playback control unit 14 performs the image switch based on a result of the search performed by the search unit 17.

19 Claims, 26 Drawing Sheets

| List of playable videos/still images |
|---|
| ☐ Sports day (opening ceremony)　Recording date/time: XX.YY.XX |
| ☐ Sports day (sprint race)　　　　Recording date/time: XX.YY.XX |
| ☐ Sports day (relay race)　　　　 Recording date/time: XX.YY.XX  ← Selected |
| ☐ Sports day (dance)　　　　　　 Recording date/time: XX.YY.XX |

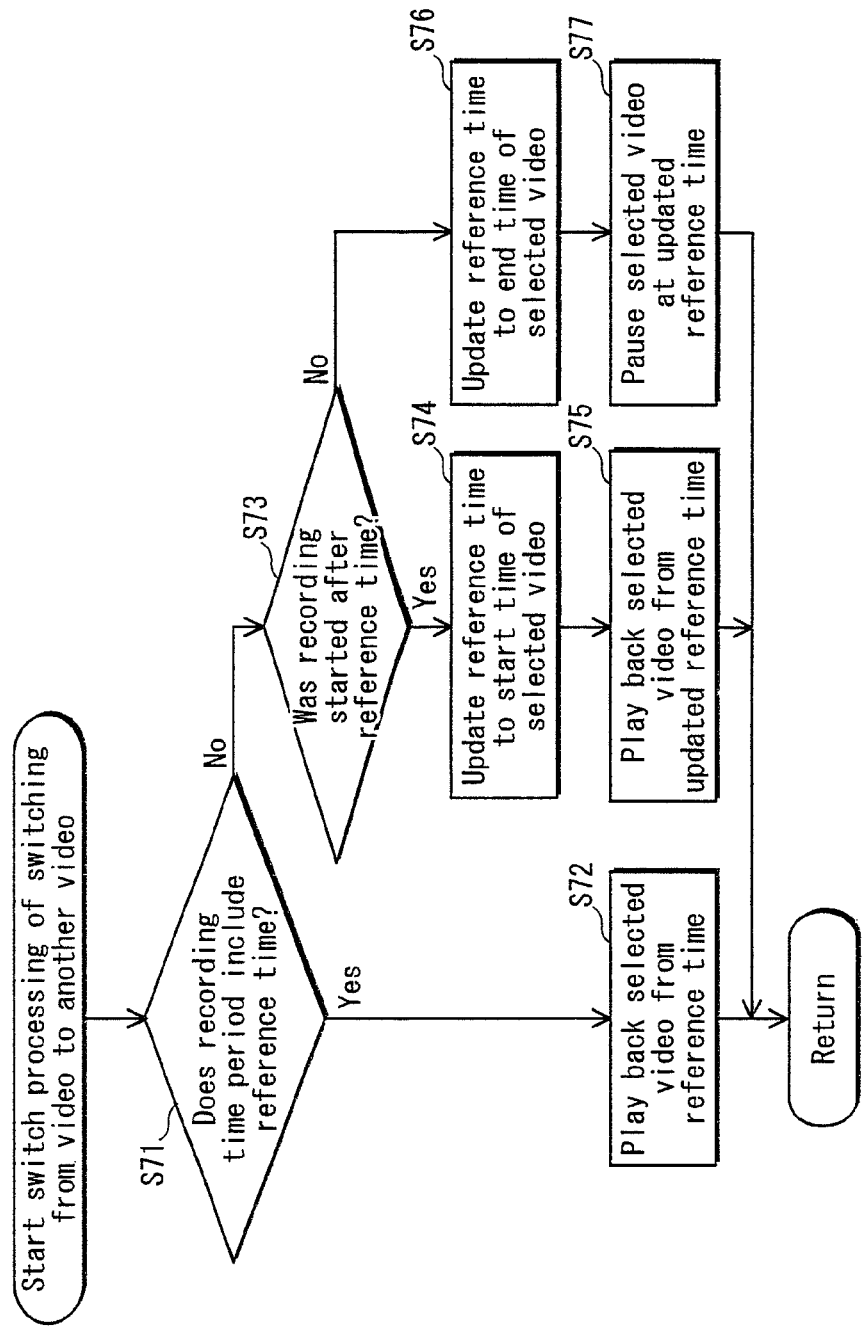

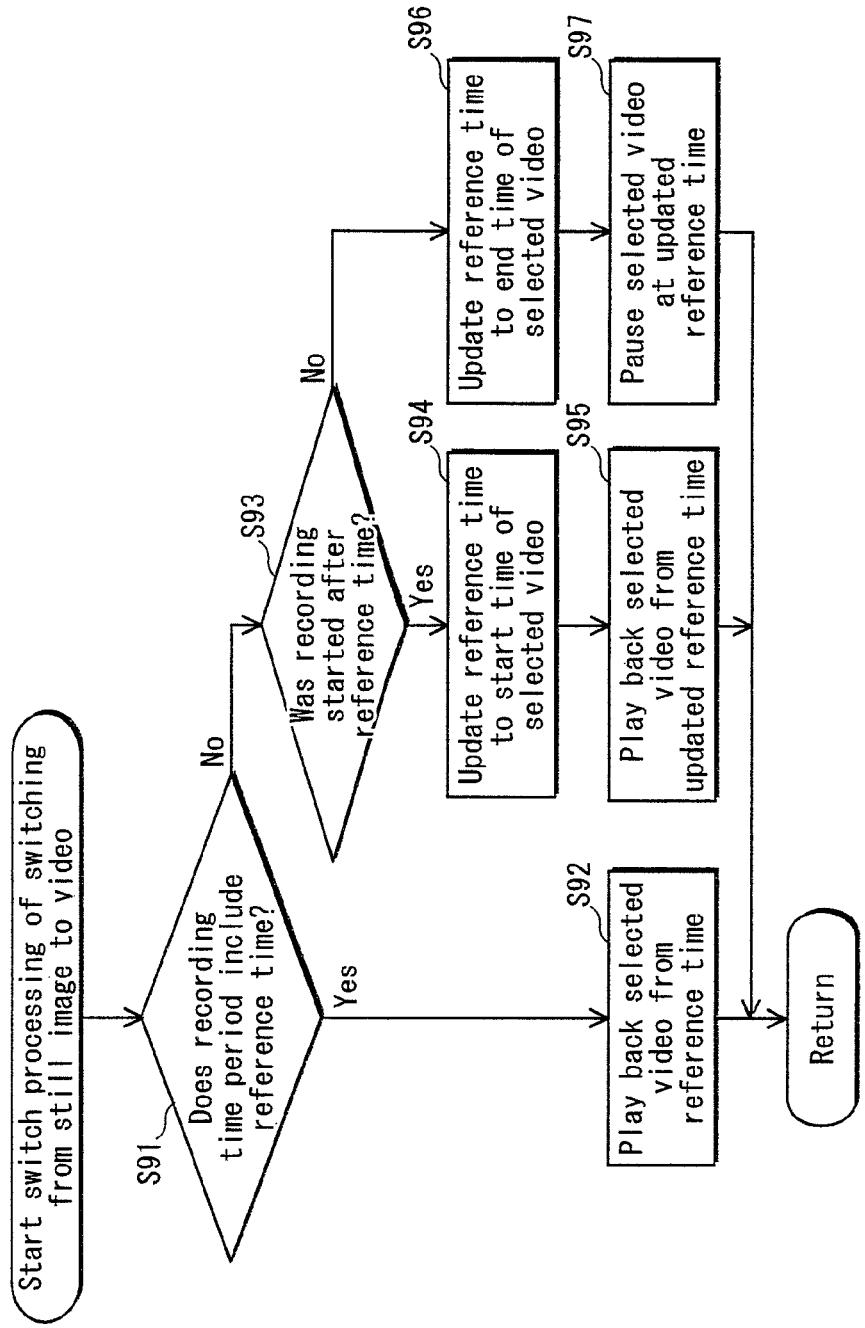

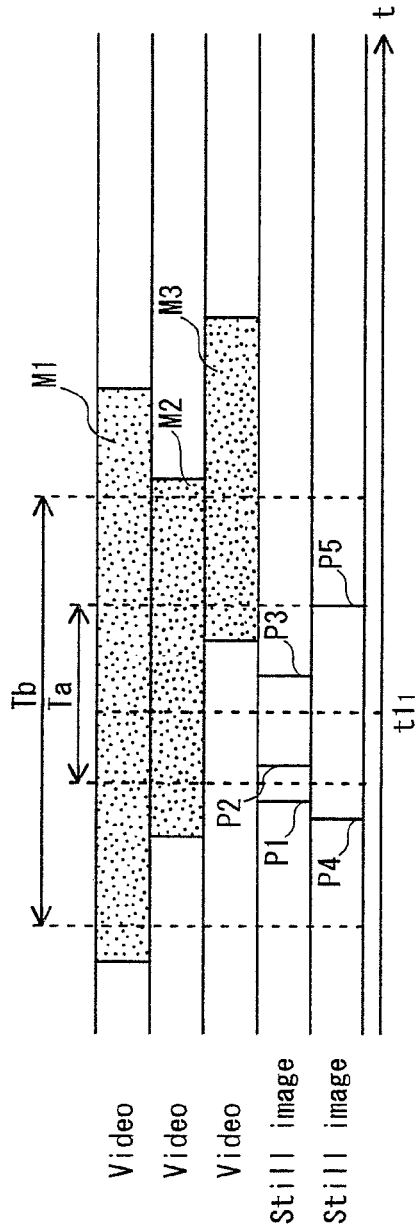
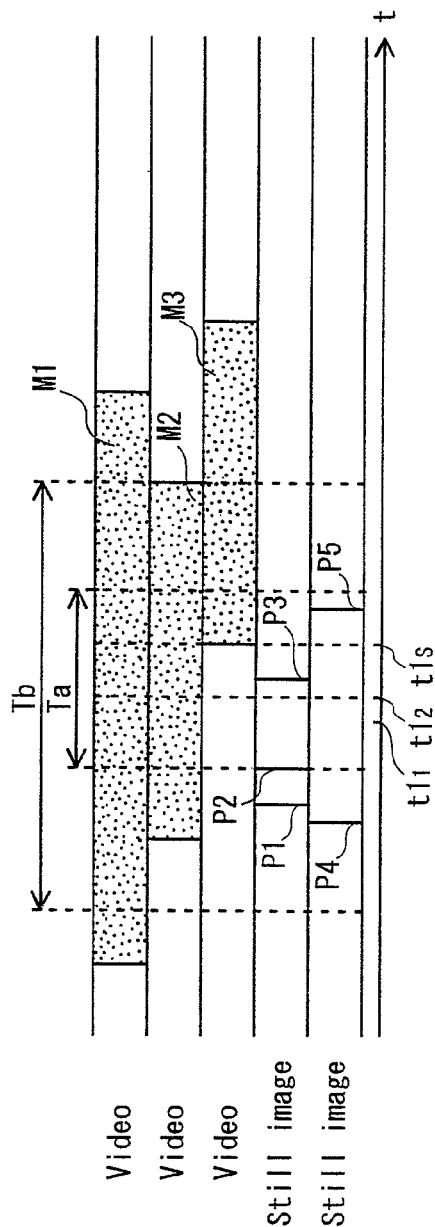

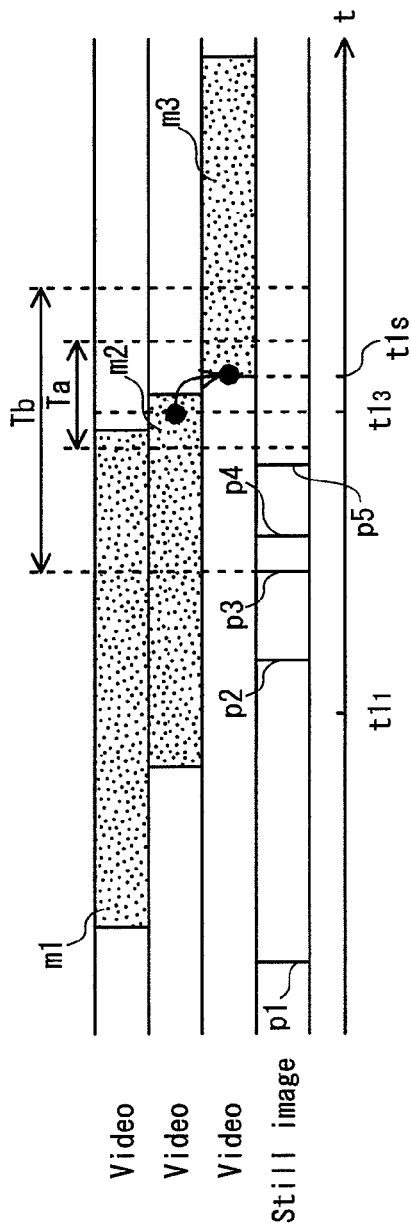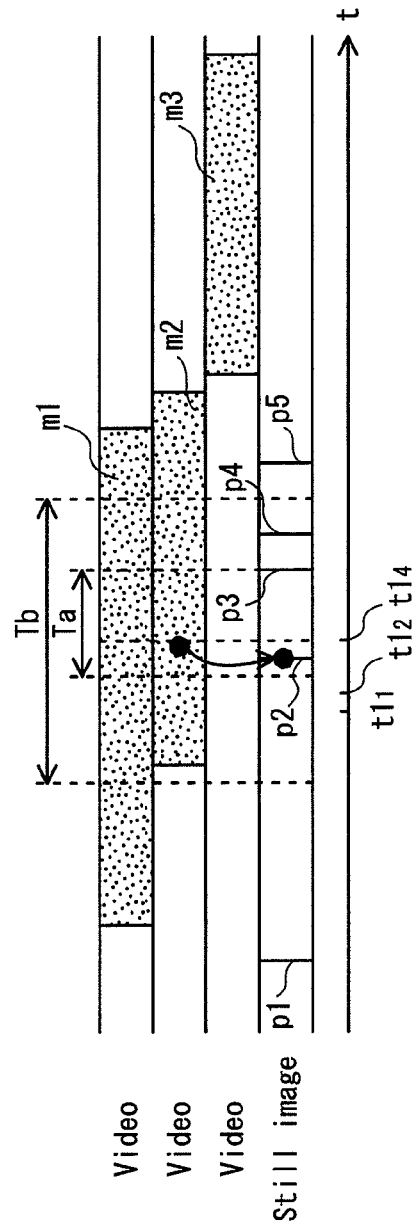

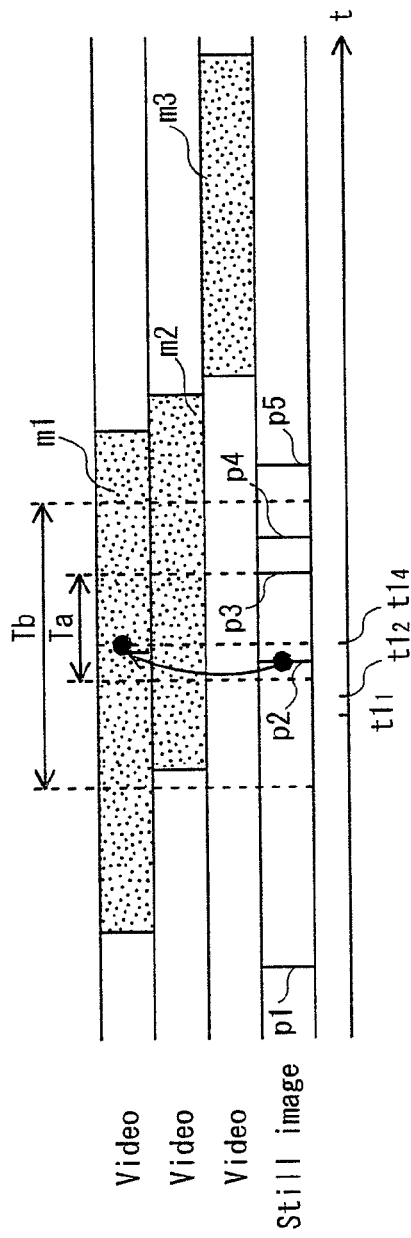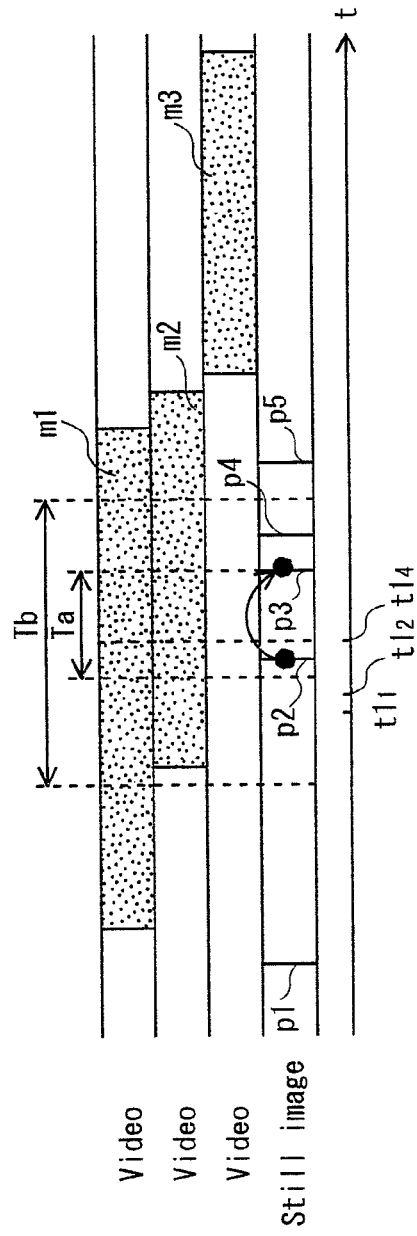

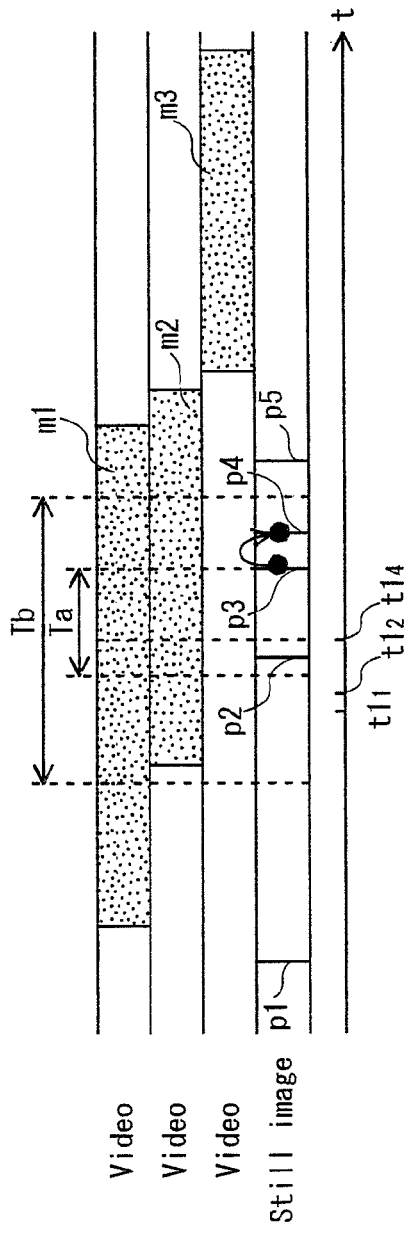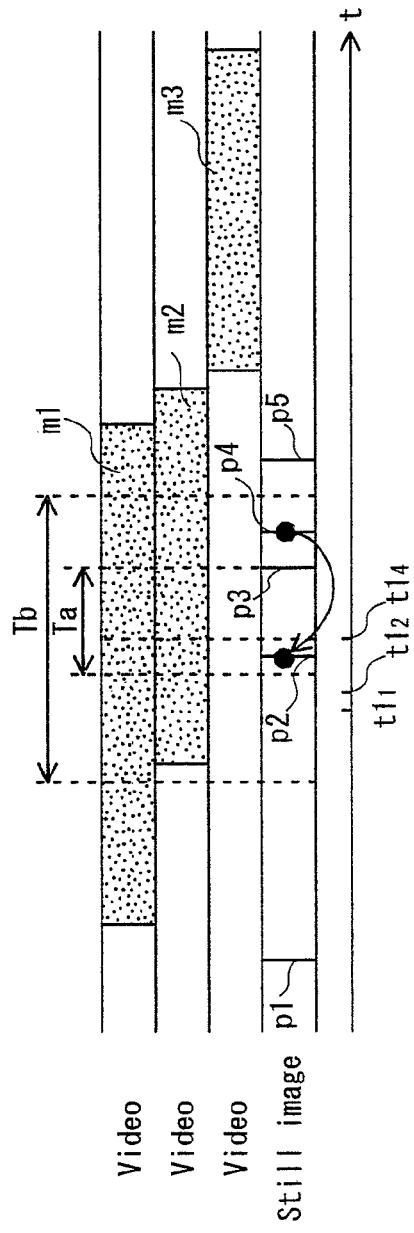

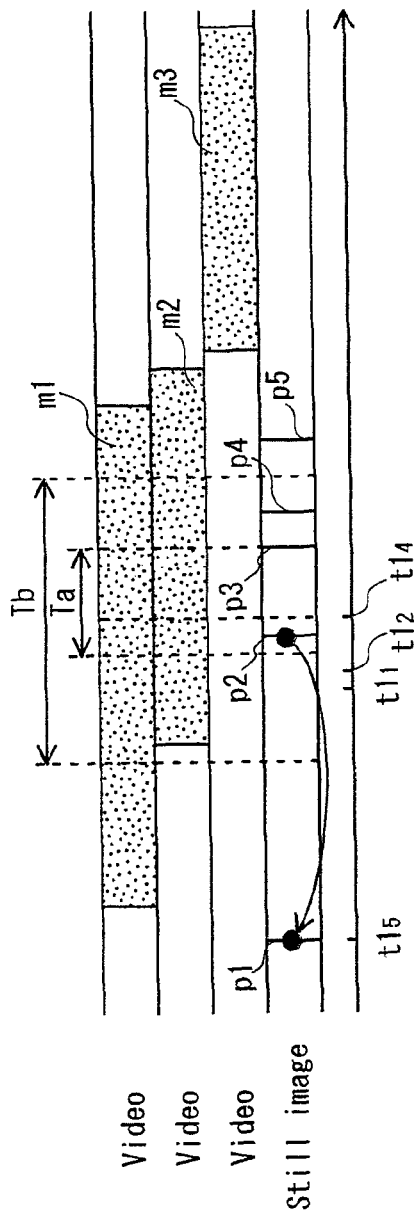
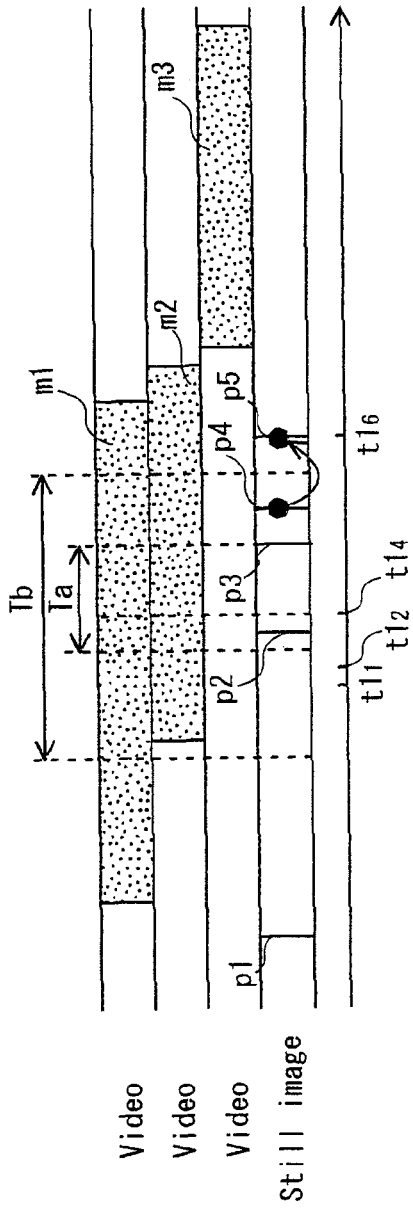

IMAGE REPRODUCTION DEVICE, IMAGE REPRODUCTION METHOD, AND IMAGE REPRODUCTION PROGRAM

TECHNICAL FIELD

The present invention relates to technology for performing multi-angle playback of videos and still images that were taken during the same time period by switching between these videos/still images.

BACKGROUND ART

In event venues and the like, people often take still images and videos at the same time as others using different imaging devices (e.g., digital cameras and digital camcorders). Especially at events such as sports days, it is often the case that a father keeps a digital camcorder and a mother keeps a digital camera, or vice versa, so they can take both still images and videos at the same time. Needless to say, other parents would be doing the same thing. As such, at many events, it is often the case that a number of attendees take still images and videos at the same time from different angles. Since all of these still images and videos show the same event taken from different angles, they may be integrally considered as multi-angle content, so to speak.

Multi-angle content is generated by aggregating videos and still images taken from different angles. Although it has been possible to switch between these videos/still images via a user operation, the authoring has been conventionally required with use of an editing device or the like when generating the multi-angle content. For example, Patent Document 1 discloses an image playback device that enables a user to switch between images taken by different cameras and plays back the images selected by the user's switch operation.

Furthermore, Patent Document 2 discloses a multi-angle playback device that plays back videos that were taken individually. This multi-angle playback device allows switching between videos that were partially or entirely taken during the same time period as other videos.

Furthermore, Patent Document 3 discloses an image playback/display device that displays each still image for a predetermined time period. The image playback/display device of Patent Document 3 can perform multi-angle playback of videos and still images without editing by, after sorting the videos and still images, simultaneously displaying some of the videos and still images that were partially or entirely taken during the same time period as other videos and still images.
Patent Document 1:
  Japanese Patent Application Publication No. H07-107437
Patent Document 2:
  Japanese Patent Application Publication No. 2003-101957
Patent Document 3:
  Japanese Patent Application Publication No. 2004-120278

DISCLOSURE OF THE INVENTION

Problems Solved by the Invention

Although the image playback device disclosed in Patent Document 1 allows switching between images taken from different angles, it leaves out of consideration the unedited images that were partially or entirely taken during the same time period as other images.

Although the multi-angle playback device disclosed in Patent Document 2 can playback videos that were partially or entirely taken during the same time period as other videos by switching from one video to another, it leaves still images out of consideration.

Although the image playback/display device disclosed in Patent Document 3 can perform multi-angle playback of videos and still images by displaying each still image for a predetermined time period, this multi-angle playback is not performed by switching between the videos and still images.

In view of the above, it is an object of the present invention to provide an image playback device, an image playback method and an image playback program that can perform, without editing, multi-angle playback of videos and still images that were taken individually using different imaging devices, by switching between these videos and still images.

Means to Solve the Problems

In order to achieve the above object, the image playback device of the present invention comprises: a storage unit for storing (i) a plurality of videos and a plurality of still images, and (ii) for each video and each still image, an image information piece including an imaging time at which the video or the still image was taken; a playback control unit operable to playback each video and each still image; a time management unit operable to manage a reference time in accordance with the playback performed by the playback control unit and the imaging times; a reception unit operable to receive, from a user, a switch instruction that causes an image switch to be performed; and a search unit operable to, when the reception unit receives the switch instruction, perform at least one of the following (i) and (ii) with reference to the image information pieces: (i) searching for, from among the videos, a video that meets a predetermined condition with respect to the reference time, and (ii) searching for, from among the still images, a still image whose imaging time is within an image search time range that includes the reference time, wherein the playback control unit performs the image switch in accordance with a result of the search performed by the search unit.

Also, an image playback method of the present invention comprises: a playback step of playing back a plurality of videos and a plurality of still images that are stored, in one-to-one correspondence with image information pieces, in a storage unit, each image information piece including an imaging time at which the video or the still image was taken; a time management step of managing a reference time in accordance with the playback performed in the playback step and the imaging times; a reception step of receiving, from a user, a switch instruction that causes an image switch to be performed; a search step of, when the switch instruction is received in the receiving step, performing at least one of the following (i) and (ii) with reference to the image information pieces: (i) searching for, from among the videos, a video that meets a predetermined condition with respect to the reference time, and (ii) searching for, from among the still images, a still image whose imaging time is within an image search time range that includes the reference time; and an image switch step of performing the image switch in accordance with a result of the search performed in the search step.

Also, an image playback program of the present invention causes a computer to execute the following steps: a playback step of playing back a plurality of videos and a plurality of still images that are stored, in one-to-one correspondence with image information pieces, in a storage unit, each image information piece including an imaging time at which the video or the still image was taken; a time management step of managing a reference time in accordance with the playback performed in the playback step and the imaging times; a reception step of receiving, from a user, a switch instruction that causes an image switch to be performed; a search step of, when the switch instruction is received in the receiving step, performing at least one of the following (i) and (ii) with reference to the image information pieces: (i) searching for, from among the videos, a video that meets a predetermined condition with respect to the reference time, and (ii) searching for, from among the still images, a still image whose imaging time is within an image search time range that includes the reference time; and an image switch step of performing the image switch in accordance with a result of the search performed in the search step.

Effects of the Invention

The above image playback device, image playback method and image playback program search for still images from the image search time range; this way, the still images, none of whose imaging times has a temporal range, can be effectively searched for. Furthermore, in accordance with the switch instruction, the above device, method and program perform the image switch by at least one of (i) searching for videos and (ii) searching for still images. Accordingly, the image switch can be performed smoothly without editing the videos and still images in advance.

In the above image playback device, the video that meets the predetermined condition may be a video that was, at least partially, taken during a video search time range that includes the reference time.

With the above structure, a currently played video or still image can be switched to a video whose imaging time (the time period between the start time and the end time thereof) does not include the reference time.

In the above image playback device, when the image switch performed by the playback control unit is to switch from playback of one of the videos to playback of one of the still images, the time management unit may leave the reference time unchanged.

After playback of a video is switched to playback of one or more still images, if the playback of the one or more still images is again switched to playback of the same or another video, the above structure makes it possible to play back the video(s) sequentially in terms of time.

In the above image playback device, when the image switch performed by the playback control unit is to switch from playback of one of the still images to playback of another one of the still images, the time management unit may leave the reference time unchanged.

Every time playback of a still image is switched to playback of another still image, the above structure leaves the reference time unchanged; for example, the reference time remains the same as the reference time set when playback of a video was previously switched to playback of a still image.

In the above image playback device, when the image switch performed by the playback control unit is to switch from playback of one of the still images to playback of one of the videos, the playback control unit may playback the one of the videos from the reference time managed by the time management unit.

When playback of a still image is switched to playback of a video, the above structure makes it possible to play back the video sequentially in terms of time.

In the above image playback device, when the image switch performed by the playback control unit is to switch from playback of one of the videos to playback of one of the still images, the time management unit may (i) leave the reference time unchanged in a case where the switch instruction does not include an update sub-instruction, and (ii) update the reference time to the imaging time of the one of the still images in a case where the switch instruction includes the update sub-instruction, the update sub-instruction being an instruction issued by the user to update the reference time.

In the above image playback device, when the image switch performed by the playback control unit is to switch from playback of one of the still images to playback of another one of the still images, the time management unit may (i) leave the reference time unchanged in a case where the switch instruction does not include an update sub-instruction, and (ii) update the reference time to the imaging time of the other one of the still images in a case where the switch instruction includes the update sub-instruction, the update sub-instruction being an instruction issued by the user to update the reference time.

The above structures update the reference time when switching to playback of a still image. This way, when a video is played back next time, the video will be played back from a time point desired by the user.

In the above image playback device, the image search time range may include (i) a first time sub-range that precedes the reference time and (ii) a second time sub-range that follows the reference time, and the first and second time sub-ranges of the image search time range may be different from each other in length.

In the above image playback device, the video search time range may include (i) a first time sub-range that precedes the reference time and (ii) a second time sub-range that follows the reference time, and the first and second time sub-ranges of the video search time range may be different from each other in length.

By reducing the first time sub-ranges of the image search time range and the video search time range in length, the above structures can prevent discomfort to the user's eyes when the imaging time of a currently played video or still image precedes the imaging time of a previously played video or still image.

In the above image playback device, the image search time range and the video search time range may be different from each other in length.

When switching to playback of a video, it is preferable to search for videos whose imaging times are as close as possible to the reference time. On the other hand, when switching to playback of a still image, it is preferable to search for still images from a longer time range. The above structure enables a video/image search conforming to these preferences, thus realizing a better image switch.

The above image playback device may further comprise an interface unit operable to connect to an external device storing (i) a plurality of other videos and a plurality of other still images, and (ii) for each of the other videos and the other still images, an image information piece including an imaging time at which the other video or the other still image was taken, wherein the video that meets the predetermined condition is searched for from among the videos stored in the storage unit and the other videos stored in the external device, and the still image whose imaging time is within the image search time range is searched for from among the still images stored in the storage unit and the other still images stored in the external device.

The above structure allows selecting a video or still image to which a currently played video or still image will be switched from among a wider range of videos and still images.

BRIEF DESCRIPTION OF THE DRAWINGS

FIG. 10 is a flow chart of switch processing of switching from a video to another video, which is shown in FIG. 5;

FIG. 11 is a flowchart of switch processing of switching from a still image to a video, which is shown in FIG. 5;

FIG. 12 shows a specific example of the image switch processing performed by the image playback device of FIG. 1;

FIG. 13 shows another specific example of the image switch processing performed by the image playback device of FIG. 1;

FIG. 25 shows yet another specific example of the image switch processing performed by the image playback device of FIG. 17;

FIG. 26 shows yet another specific example of the image switch processing performed by the image playback device of FIG. 17;

FIG. 27 shows yet another specific example of the image switch processing performed by the image playback device of FIG. 17;

FIG. 28 shows yet another specific example of the image switch processing performed by the image playback device of FIG. 17;

FIG. 29 shows yet another specific example of the image switch processing performed by the image playback device of FIG. 17;

FIG. 30 shows yet another specific example of the image switch processing performed by the image playback device of FIG. 17;

FIG. 31 shows yet another specific example of the image switch processing performed by the image playback device of FIG. 17;

FIG. 32 shows yet another specific example of the image switch processing performed by the image playback device of FIG. 17;

DESCRIPTION OF THE CHARACTERS

Figure 1:
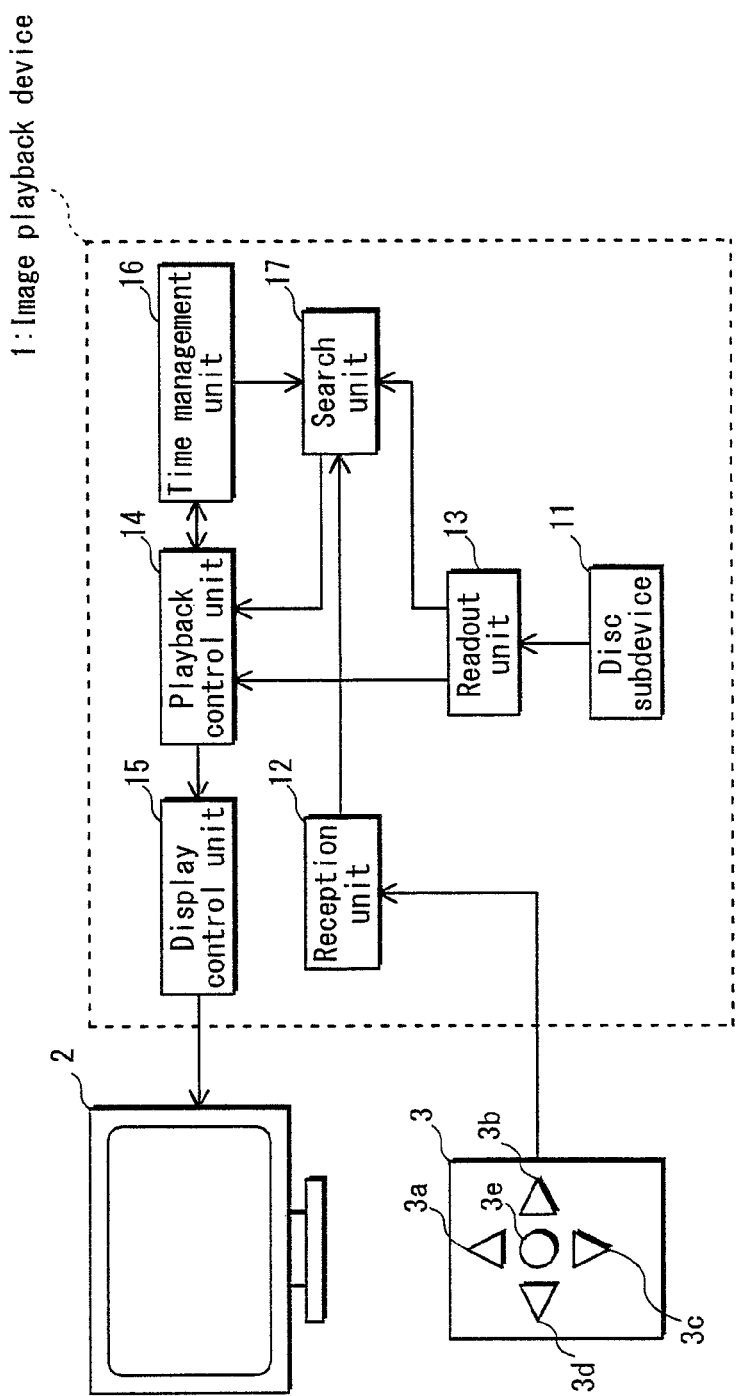
FIG. 1 is a structural diagram of an image playback device pertaining to Embodiment 1.

1 image playback device
2 display device
3 remote control
11 disc subdevice
12 reception unit
13 readout unit
14 playback control unit
15 display control unit
16 time management unit
17 search unit

BEST MODE FOR CARRYING OUT THE INVENTION

Embodiments of the present invention are described below with reference to the drawings.

Below, a video that had been played back until image switch is referred to as an "anterior video", whereas a video that is to be played back after the image switch is refereed to as a "posterior video". Likewise, a still image that had been played back until the image switch is referred to as an "anterior still image", whereas a still image that is to be played back after the image switch is referred to as a "posterior still image".

<<Embodiment 1>>

The following describes Embodiment 1 of the present invention with reference to the drawings.

<Structure of Image Playback Device>

The structure of an image playback device 1 pertaining to the present embodiment is described below with reference to FIG. 1. FIG. 1 is a structural diagram of the image playback device 1.

FIG. 1 shows: the image playback device 1; a display device 2 that comprises, for example, a liquid crystal display and is connected to the image playback device 1 by, for example, a wired connection; and a remote control 3 that performs infrared data communication or the like with the image playback device 1. It should be noted here that a mode of connection between the image playback device 1 and the display device 2, as well as a mode of communication between the image playback device 1 and the remote control 3, are not limited to those described above.

The remote control 3 is a device used by a user to perform various operations, such as (i) starting/stopping playback of a video or a still image and (ii) performing image switch. The remote control 3 has various buttons including four-way pushbuttons 3a through 3d and a center button 3e. The remote control 3 transmits a hold-down signal indicating specifics of a button that has been held down. The hold-down signal is received by the image playback device 1. For the sake of simple explanation, the center button 3e is referred to as an "image switch button" while the image playback device 1 is playing back an image.

The image playback device 1 includes: a disc subdevice 11; a reception unit 12; a readout unit 13; a playback control unit 14; a display control unit 15; a time management unit 16; and a search unit 17. Here, a central processing unit (CPU) integrally performs functions of the reception unit 12, the readout unit 13, the playback control unit 14, the display control unit 15, the time management unit 16 and the search unit 17 by, for example, (i) reading out a program associated with image playback and image switch, and (ii) executing the read program. Specifics of processing performed by the reception unit 12, the readout unit 13, the playback control unit 14, the display control unit 15, the time management unit 16 and the search unit 17 will be explained in the following <Operations of Image Playback Device> section. A simple overview of these units is given below.

The disc subdevice 11 is a storage device for storing data. More specifically, the disc subdevice 11 stores therein (i) one or more videos and still images taken by a digital camcorder, a digital camera, etc., and (ii) for each of the videos and still images stored, image information including an imaging time at which the video or still image was taken, etc. It should be mentioned here that the imaging time included in the image information of each video is composed of a pair of (i) a start time at which the recording of the video was started and (ii) an end time at which the recording of the video was ended. On the other hand, the imaging time included in the image information of each still image is simply a time at which the still image was taken. The videos and still images stored in the disc subdevice 11 are managed by their file names.

In order for the user to playback videos or still images using the image playback device 1, these videos or still images, as well as their image information pieces, must be stored in the disc subdevice 11 in advance. For example, the image playback device 1 may store the videos and still images into the disc subdevice 11. Alternatively, videos and still images taken by other imaging devices may be transferred from the other imaging devices to the disc subdevice 11, together with the image information pieces thereof. At this time, the transfer may be conducted either (i) by connecting the other imaging devices to the image playback device 1, or (ii) via an SD memory or a Compact Flash®.

The image information pieces of the videos and still images that are stored into the disc subdevice 11 in the aforementioned manner are each saved either (i) in the same file as the corresponding video or still image, or (ii) in another file linked to the corresponding video or still image. The imaging times etc. included in the image information pieces can be stored using a common method. Accordingly, detailed explanations regarding a method of storing the imaging times etc. are omitted.

The reception unit 12 receives a hold-down signal transmitted from the remote control 3. The readout unit 13 reads out, from the disc subdevice 11, (i) a selected video or still image and (ii) the corresponding image information including the imaging time etc.

The playback control unit 14 plays back the video or still image read out by the readout unit 13. The display control unit 15 displays, onto the display device 2, the video or still image that is currently played back by the playback control unit 14.

The time management unit 16 manages time information indicating a reference time. The reference time is, for example, a criterial time to be referenced when setting time ranges from which videos and still images should be searched for. When switching from playback of a still image to playback of a video, the reference time is also a criterial time from which the playback of the video should be started.

If the reception unit 12 receives a hold-down signal indicating that the image switch button 3e has been held down, then the search unit 17 searches for videos and still images with reference to (i) the image information pieces stored in the disc subdevice 11 and (ii) the time information managed by the time management unit 16.

<Operations of Image Playback Device>

The following describes image playback processing and image switch processing performed by the image playback device 1 of FIG. 1.

(Image Playback Processing)

Figure 2:
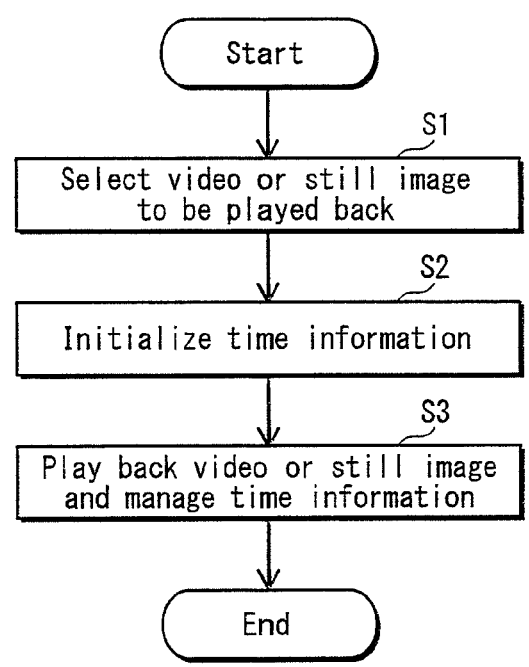
FIG. 2 is a flowchart of image playback processing performed by the image playback device of FIG. 1.

With reference to FIG. 2, the following describes the image playback processing performed by the image playback device 1 of FIG. 1. FIG. 2 is a flowchart of the image playback processing performed by the image playback device 1 of FIG. 1.

With use of the remote control 3, the user selects a video or still image that the user wants to playback from now, and instructs the image playback device 1 to playback the selected image. The reception unit 12 in the image playback device 1 receives a hold-down signal from the remote control 3. The readout unit 13 reads out, from the disc subdevice 11, (i) the video or still image selected by the user and (ii) the image information of the read video or still image (Step S1). At this time, the user selects a video or still image in the following manner, for example: once a list of playable videos/images has been displayed on the display device 2 as exemplarily depicted in FIG. 3, the user selects, from the list, a video or still image that the user wants to play back. On the list exemplarily depicted in FIG. 3, the video or still image that is currently selected is displayed to the user in a different manner from other videos or still images on the list.

When the user has selected a video, the time management unit 16 initializes the reference time indicated by the time information to the start time included in the image information of the selected video, the image information having been read out by the readout unit 13 and output to the time management unit 16 via the playback control unit 14. On the other hand, when the user has selected a still image, the time management unit 16 initializes the reference time indicated by the time information to the imaging time included in the image information of the selected still image, the image information having been read out by the readout unit 13 and output to the time management unit 16 via the playback control unit 14 (Step 2).

The playback control unit 14 plays back the video or still image read out by the readout unit 13. The display control unit 15 displays, onto the display device 2, the video or still image that is currently played back by the playback control unit 14. During playback of a video, the time management unit 16 keeps updating the reference time to the imaging time of, from among all the frames constituting the video, a frame that is currently played back (Step S3). On the other hand, during playback of still images, the time management unit 16 does not update the reference time.

Due to the above structure, in the present embodiment, the reference time coincides with the imaging time of a frame of a video that is currently displayed on the display device 2.

Between (i) a time at which a video is switched to a still image and (ii) a still image is switched back to a video, the reference time does not always coincide with the imaging time of a still image currently displayed on the display device 2.

(Patterns of Image Switch)

Figures 3, 4:
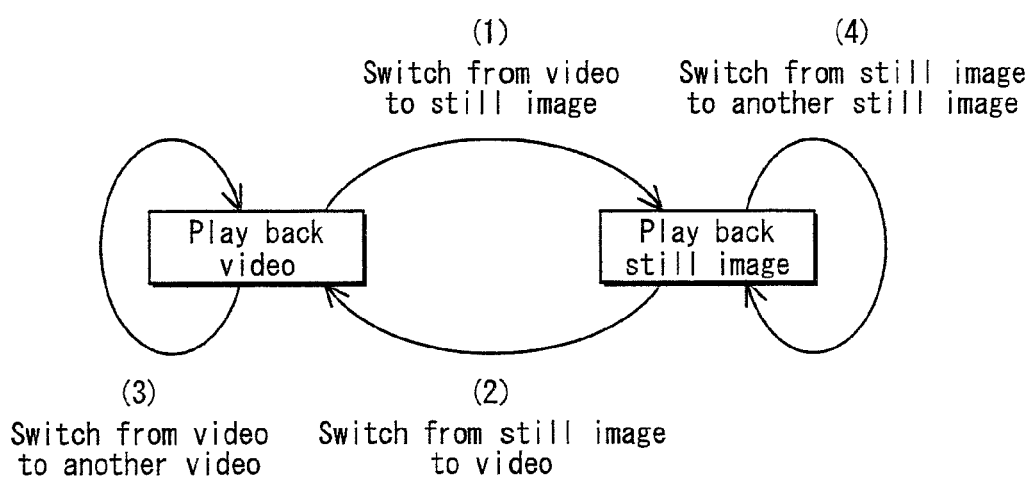
FIG. 3 shows an exemplary list of playable videos/images to be displayed on a display device of FIG. 1.
FIG. 4 is a transition diagram showing different patterns of image switch performed by the image playback device of FIG. 1.

With reference to FIG. 4, the following describes different patterns of image switch performed by the image playback device 1 of FIG. 1. FIG. 4 is a transition diagram showing different patterns of image switch performed by the image playback device of FIG. 1.

There are four patterns of image switch performed by the image playback device 1, namely, (1) switching from play back of a video to play back of a still image, (2) switching from playback of a still image to playback of a video, (3) switching from playback of a video to playback of another video, and (4) switching from playback of a still image to playback of another still image.

(Image Switch Processing)

Figure 5:
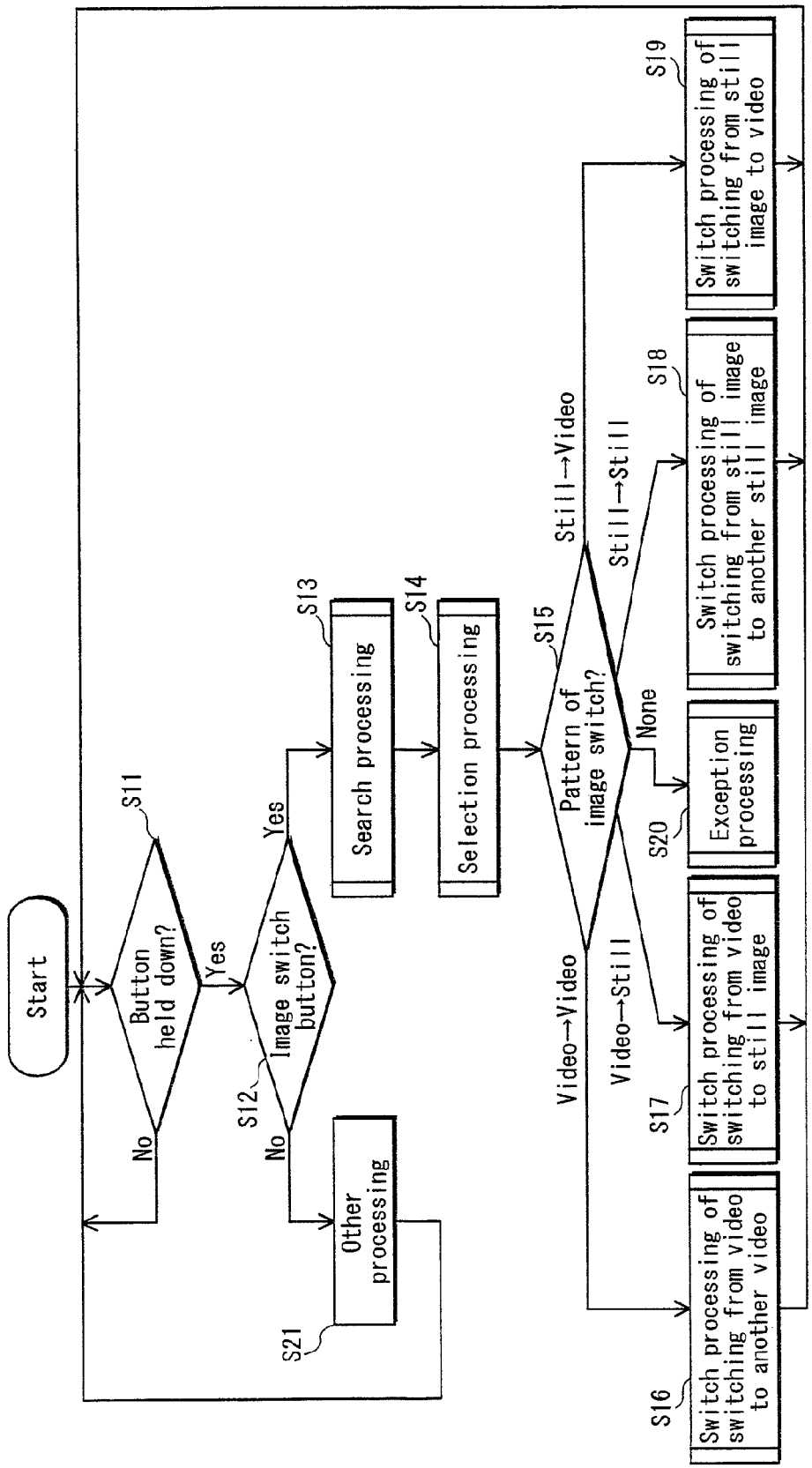
FIG. 5 is a flowchart of image switch processing performed by the image playback device of FIG. 1.

With reference to FIG. 5, the following describes the image switch processing performed by the image playback device 1 of FIG. 1. FIG. 5 is a flowchart of the image switch processing performed by the image playback device 1 of FIG. 1.

The reception unit 12 judges whether the user has performed a button operation on the remote control 3 (hereinafter, this action is referred to as holding down of a button), i.e., whether it has received a hold-down signal from the remote control 3 (Step S11). The reception unit 12 repeats the processing of Step S11 until the user holds down a button on the remote control 3 (S11: No). When judging that the user has held down a button (S11: Yes), the reception unit 12 further judges, based on the received hold-down signal, whether the button held down by the user is the image switch button 3e (Step S12). When the button held down by the user is not the image switch button 3e (S12: No), the image playback device 1 performs processing according to the button held down by the user (Step S21), and returns to Step S11 and performs the processing thereof.

When the button held down by the user is the image switch button 3e (S12: Yes), the image playback device 1 searches for videos and still images (Step S13), and based on a result of the search conducted in Step S13, selects a video or still image to be switched to and played back (Step S14). The playback control unit 14 judges into which one of the above-mentioned patterns the upcoming image switch would fall, based on (i) a type of the image (i.e., video or still image) that is currently played back and (ii) a type of the image selected in Step S14 (Step S15).

When a video is currently played back and a video is selected in Step S14 (S15: Video→Video), the image playback device 1 performs switch processing of switching from a video to another video (Step S16). When a video is currently played back and a still image is selected in Step S14 (S15: Video→Still), the image playback device 1 performs switch processing of switching from a video to a still image (Step S17). When a still image is currently played back and a still image is selected in Step S14 (S15: Still→Still), the image playback device 1 performs switch processing of switching from a still image to another still image (Step S18). When a still image is currently played back and a video is selected in Step S14 (S15: Still→Video), the image playback device 1 performs switch processing of switching from a still image to a video (Step S19).

When the image playback device 1 does not select any image to replace the currently played image (S15: None), the image playback device 1 performs exception processing (Step S20). The exception processing is processing of displaying, onto a display device 2, a notification indicating that there are no images to replace the currently played image. The exception processing is, however, not limited to this.

{Search Processing}

Figure 6:
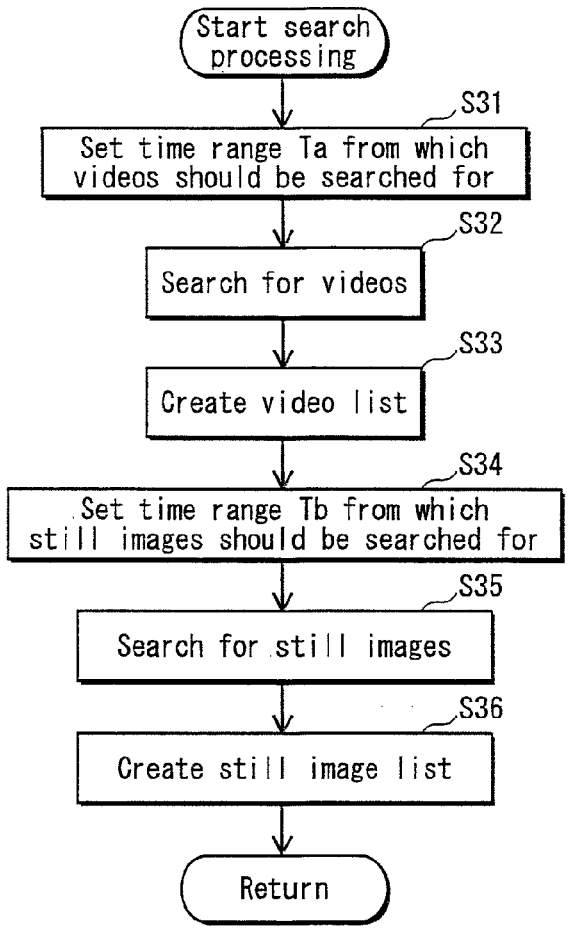
FIG. 6 is a flowchart of search processing shown in FIG. 5.

A description of the search processing (Step S13) shown in FIG. 5 is given below, with reference to FIG. 6. FIG. 6 is a flowchart of the search processing shown in FIG. 5.

Figure 7:
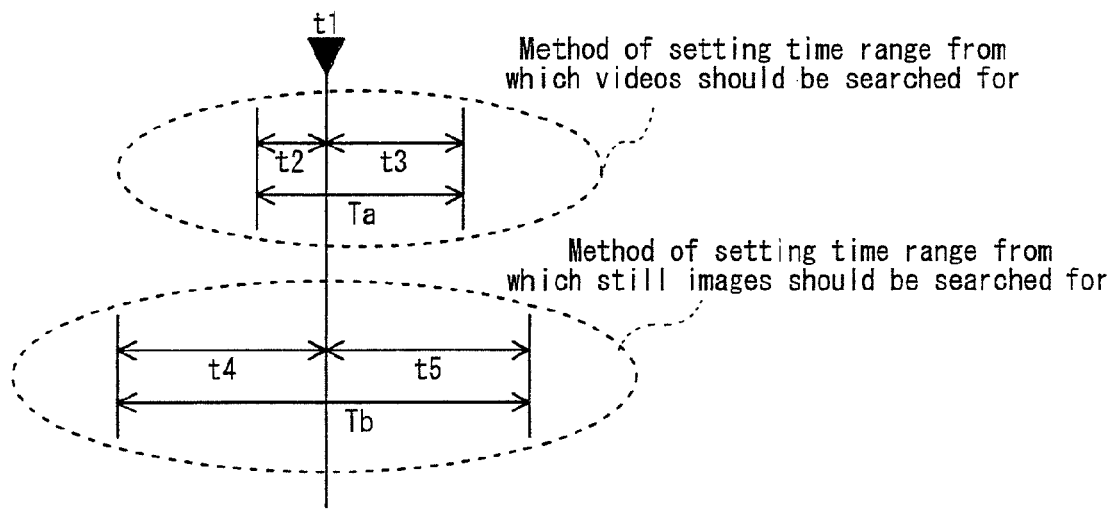
FIG. 7 shows how Ta and Tb are set, the Ta and Tb being time ranges from which a search unit of FIG. 1 should search for videos and still images, respectively.

The reception unit 12 instructs the search unit 17 to search for videos and still images. Upon receiving this instruction, the search unit 17 sets a time range Ta from which videos should be searched for, based on the reference time indicated by the time information that is managed by the time management unit 16 (Step S31). With reference to FIG. 7, the following explains how the time range Ta is set. In FIG. 7, a time t1 is the reference time indicated by the time information that is managed by the time management unit 16.

Based on the time t1, the search unit 17 sets the following as the time range Ta from which videos should be searched for: a time range between (i) a time point (t1−t2) that is ahead of the time t1 by a time period t2 and (ii) a time point (t1+t3) that is behind the time t1 by a time period t3. Hence, the time range Ta is (t1−t2≦Ta≦t1+t3).

If the time period t2 is extended, i.e., if videos are searched for from a longer time range starting from a time point that is ahead of (t1−t2) (or older than (t1−t2)), then the search result will include a large number of videos whose end times, at which the recordings thereof were ended, precede the time t1. If the currently played image is switched to any of these videos, there is a higher chance that the playback of the video would be ended in a short time, and therefore it would be pointless to switch to any of these videos. On the other hand, if the time period t3 is extended, i.e., if videos are searched for from a longer time range ending at a time point that is behind (t1+t3) (or newer than (t1+t3)), then the search result will include a large number of videos whose start times, at which the recordings thereof were started, are far behind the time t1. When switching to any of these videos, the user would often feel that several scenes have been skipped between the image played back immediately before the image switch and the video played back immediately after the image switch, i.e., this video is not exactly what the user had expected. For the above reasons, in order to search for videos, it is preferable that the time periods t2 and t3 are short; i.e., it is preferable to reduce the time range Ta, from which videos should be searched for, in the older and newer directions with respect to the time t1.

The length of the time period t2 may be the same as or different from the length of the time period t3. The time period t2 may be longer than the time period t3, i.e., the time range Ta may extend longer in the older direction than in the newer direction.

The search unit 17 acquires the image information pieces of the videos from the disc subdevice 11 via the readout unit 13. Then, with reference to the start times and end times included in the acquired image information pieces, the search unit 17 searches the disc subdevice 11 for videos whose recording time periods overlap at least a part of the time range Ta, each recording time period being a time period between the start time and end time of the video (Step S32). Thereafter, the search unit 17 sorts the searched videos by their start times, and creates a list showing the sorted videos (hereinafter, a "video list") (Step S33). Alternatively, the searched videos maybe sorted, for example, by their file names or in order of when they were stored into the disc subdevice 11, instead of sorting them by their start times. Or, the searched videos may not be sorted. It is also possible to, every time the search for videos is conducted, keep the order of the videos on the video list unchanged; this way, the user would not be confused upon the image switch.

After completing the creation of the video list, the search unit 17 sets a time range Tb from which still images should be searched for, based on the reference time indicated by the time information that is managed by the time management unit 16 (Step S34). With reference to FIG. 7, the following explains how the time range Tb is set. In FIG. 7, the time t1 is the reference time indicated by the time information that is managed by the time management unit 16.

Based on the time t1, the search unit 17 sets the following as the time range Tb from which still images should be searched for: a time range between (i) a time point (t1−t4) that is ahead of the time t1 by a time period t4 and (ii) a time point (t1+t5) that is behind the time t1 by a time period t5. Hence, the time range Tb is (t1−t4≦Tb≦t1+t5).

The length of the time range Ta (from which videos should be searched for) may be the same as or different from the length of the time range Tb (from which still images should be searched for). It should be mentioned here that none of the imaging times of the still images has a temporal range, as opposed to each video whose imaging time ranges from the start time to the end time. For this reason, if the search unit 17 ever searches for only the still images whose imaging times coincide with the time t1, the search unit 17 would mostly fail to find any of such still images. It is therefore preferable to search still images from a sufficiently long time range. For example, in a case where the time range Tb from which still images are searched for is longer than the time range Ta from which videos are searched for (Ta<Tb), the image switch operation can be smoothly carried out as compared to the opposite case.

The length of the time period t4 may be the same as or different from the length of the time period t5. The time period t5 may be longer than the time period t4, i.e., the time range Tb may extend longer in the newer direction than in the older direction.

The search unit 17 acquires the image information pieces of the still images from the disc subdevice 11 via the readout unit 13. Then, with reference to the imaging times included in the acquired image information pieces, the search unit 17 searches the disc subdevice 11 for still images whose imaging times fall within the time range Tb (Step S35). Thereafter, the search unit 17 sorts the searched still images in order of the closeness of their imaging times to the reference time, and creates a list showing the sorted still images (hereafter, a "still image list") (Step S36). As the created still image list shows the searched still images sorted in order of the closeness of their imaging times to the reference time, the searched still images will accordingly be displayed on the display device 2 in order of the closeness of their imaging times to the reference time. Alternatively, the searched still images may be sorted, for example, by their imaging times, by their file names, or in order of when they were stored into the disc subdevice 11, instead of sorting them in order of the closeness of their imaging times to the reference time. Or, the searched still images may not be sorted. It is also possible to, every time the search for still images is conducted, keep the order of the still images on the still image list unchanged; this way, the user would not be confused upon the image switch.

{Selection Processing}

Figure 8:
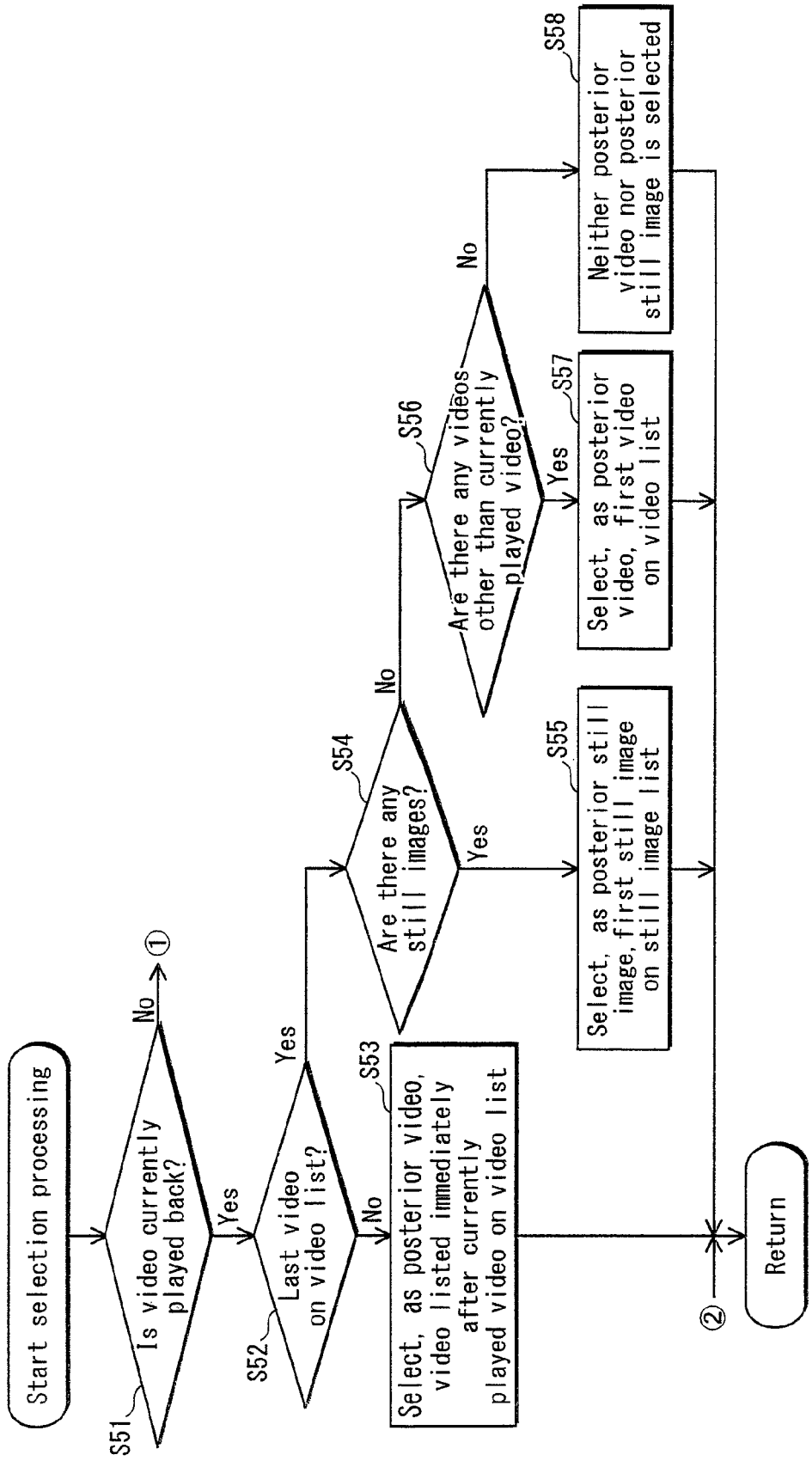
FIG. 8 is a flowchart of selection processing shown in FIG. 5.
Figure 9:
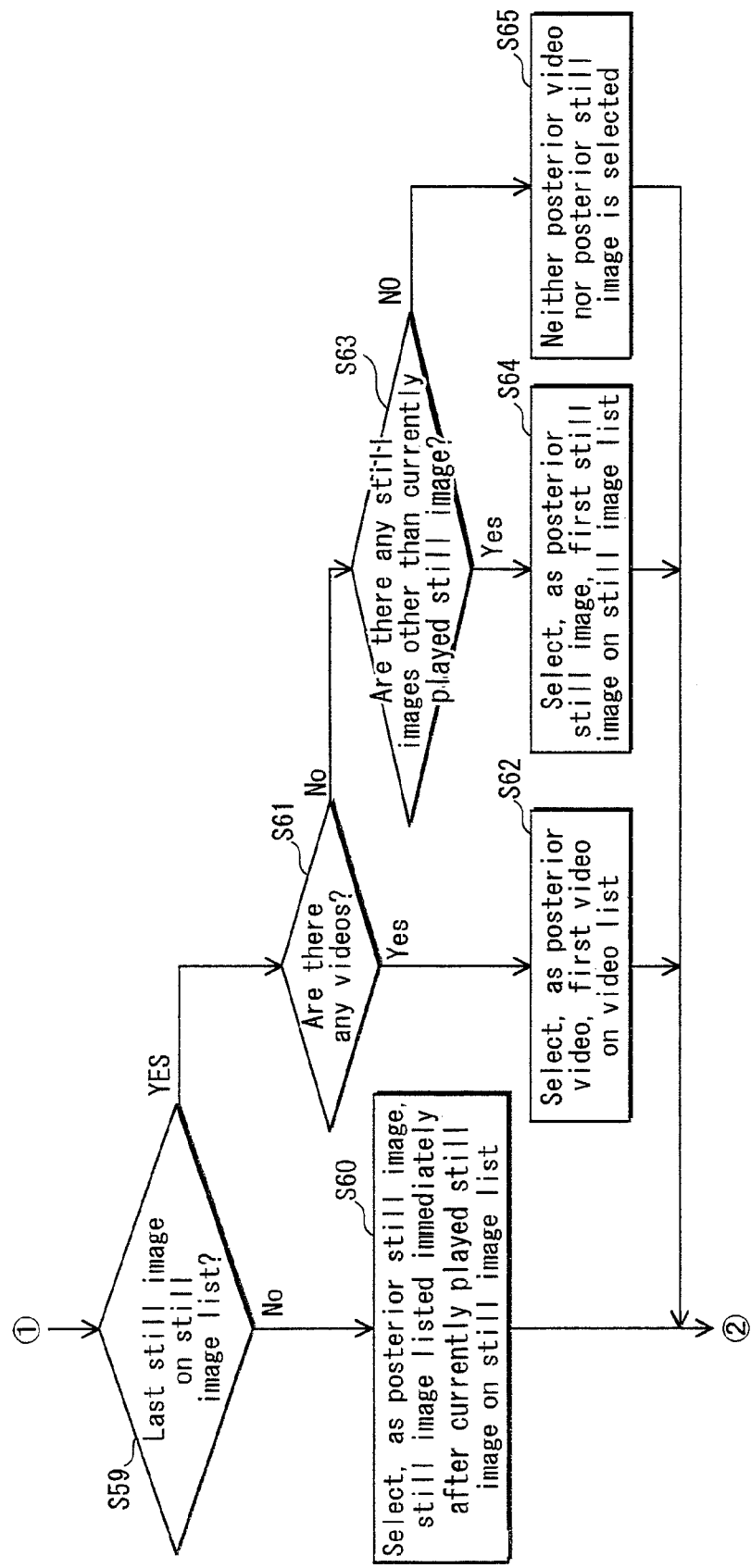
FIG. 9 is a flowchart of selection processing shown in FIG. 5.

A description of the selection processing (Step S14) shown in FIG. 5 is given below, with reference to FIGS. 8 and 9. FIGS. 8 and 9 are flowcharts of the selection processing (Step S14) shown in FIG. 5.

The search unit 17 judges whether a video is currently played back (Step S51).

When judging that a video is currently played back (S51: Yes), the search unit 17 further judges whether the currently played video is the last video on the video list (Step S52). When judging that the currently played video is not the last video on the video list (S52: No), the search unit 17 selects, as a posterior video, a video that is listed immediately after the currently played video on the video list (Step S53).

When judging that the currently played video is the last video on the video list (S52: Yes), the search unit 17 further judges whether the still image list shows any still images (Step S54). When judging that the still image list shows one or more still images (S54: Yes), the search unit 17 selects, as a posterior still image, the first still image on the still image list (Step S55).

When judging that the still image list does not show any still images (S54: No), the search unit 17 further judges whether the video list shows any videos other than the currently played video (i.e., whether the currently played video is listed second onward on the video list) (Step S56). When judging that the video list shows one or more videos other than the currently played video (S56: Yes), the search unit 17 selects, as a posterior video, the first video on the video list (Step S57). On the other hand, when judging that the video list does not show any videos other than the currently played video (S56: No), the search unit 17 selects neither a posterior video nor a posterior still image to replace the currently played video (Step S58).

When judging that a video is not currently played back (i.e., a still image is currently played back) (S51: No), the search unit 17 further judges whether the currently played still image is the last still image on the still image list (Step S59). When judging that the currently played still image is not the last still image on the still image list (S59: No), the search unit 17 selects, as a posterior still image, a still image that is listed immediately after the currently played still image on the still image list (Step S60).

When judging that the currently played still image is the last still image on the still image list (S59: Yes), the search unit 17 further judges whether the video list shows any videos (Step S61). When judging that the video list shows one or more videos (S61: Yes), the search unit selects, as a posterior video, the first video on the video list (Step S62).

When judging that the video list does not show any videos (S61: No), the search unit 17 further judges whether the still image list shows any still images other than the currently played still image (i.e., whether the currently played still image is listed second onward on the still image list) (Step S63). When judging that the still image list shows one or more still images other than the currently played still image (S63: Yes), the search unit selects, as a posterior still image, the first still image on the still image list (Step S64). On the other hand, when judging that the still image list does not show any still images other than the currently played still image (S63: No), the search unit 17 selects neither a posterior video nor a posterior still image to replace the currently played still image (Step S65).

{Switch Processing of Switching from Video to Another Video}

With reference to FIG. 10, the following describes the switch processing of switching from a video to another video (Step S16), which is shown in FIG. 5. FIG. 10 is a flowchart of the switch processing of switching from a video to another video (Step S16), which is shown in FIG. 5.

Based on the start time and end time of the video (posterior video) selected in Step S14, the playback control unit 14 judges whether a time period between the start time and end time of the posterior video includes the reference time (t1) indicated by the time information that is managed by the time management unit 16 (Step S71).

When judging that the time period between the start time and end time of the posterior video includes the reference time t1 (S71: Yes), the playback control unit 14 acquires the posterior video from the disc subdevice 11 via the readout unit 13, and plays back the posterior video from the reference time t1. The display control unit 15 displays, onto the display device 2, the posterior video that is currently played back (Step S72). The time management unit 16 keeps updating the reference time in accordance with the playback of the posterior video by the playback control unit 14.

When judging that the time period between the start time and end time of the posterior video does not include the reference time t1 (S71: No), the playback control unit 14 further judges, based on the start time of the posterior video, whether the recording of the posterior video was started after the reference time t1 (Step S73).

When the recording of the posterior video was started after the reference time t1 (S73: Yes), the time management unit 16 updates the reference time indicated by the time information to the start time of the posterior video (here, the start time of the posterior video is a time t2) (Step S74). Then, the playback control unit 14 acquires the posterior video from the disc subdevice 11 via the readout unit 13, and plays back the posterior video from the updated reference time t2. The display control unit 15 displays, onto the display device 2, the posterior video that is currently played back (Step S75). The time management unit 16 keeps updating the reference time in accordance with the playback of the posterior video by the playback control unit 14.

When the recording of the posterior video was not started after the reference time t1 (i.e., when the recording of the posterior video was ended before the reference time t1) (S73: No), the time management unit 16 updates the reference time indicated by the time information to the end time of the posterior video (here, the end time of the posterior video is a time t3) (Step S76). Then, the playback control unit 14 acquires the posterior video from the disc subdevice 11 via the readout unit 13 and plays back the posterior video from the updated reference time t3, but pauses the playback of the posterior video at the updated reference time t3. The display control unit 15 displays, onto the display device 2, the posterior video that is paused at the reference time t3 (Step S77). Step S77 is provided in view of a case where, if the posterior video is continuously played back, the playback of the posterior video is ended in a short time. Here, the reference time may be updated to, for example, a time (t1–t2) or the start time of the posterior video. In such a case, the posterior video maybe continuously played back without pause.

{Switch Processing of Switching from Video to Still Image}

The following describes the switch processing of switching from a video to a still image (Step S17), which is shown in FIG. 5.

The playback control unit 14 acquires the still image (posterior still image) selected in Step S14 from the disc subdevice 11 via the readout unit 13, and plays back the posterior still image. The display control unit 15 displays, onto the display device 2, the posterior still image that is currently played back. Note, when the playback control unit 14 switches from playback of the anterior video to playback of the posterior still image, the time management unit 16 does not update the reference time indicated by the time information to the imaging time of the posterior still image—that is, the reference time remains the same before/after the image switch. To be more specific, as the time management unit 16 leaves the reference time unchanged, the reference time remains as the imaging time of, from among all the frames constituting the anterior video, a frame that was played back immediately before the image switch. Accordingly, after the image switch, the reference time does not coincide with the imaging time of the posterior still image that is currently played back.

As described above, when switching from playback of a video to playback of a still image, the reference time is not updated. This way, in a case where the user decides to play back the video again after the user had switched from the video to a still image, playback of this video can be restarted from a time point at which it was switched to the still image.

{Switch Processing of Switching from Still Image to Another Still Image}

The following describes the switch processing of switching from a still image to another still image (Step S18), which is shown in FIG. 5.

The playback control unit 14 acquires the still image (posterior still image) selected in Step S14 from the disc subdevice 11 via the readout unit 13, and plays back the posterior still image. The display control unit 15 displays, onto the display device 2, the posterior still image that is currently played back. Note, when the playback control unit 14 switches from playback of the anterior still image to playback of the posterior still image, the time management unit 16 does not update the reference time indicated by the time information to the imaging time of the posterior still image—that is, the reference time remains the same before/after the image switch. Accordingly, the reference time during playback of the anterior still image coincides with the reference time during playback of the posterior still image.

{Switch Processing of Switching from Still Image to Video}

With reference to FIG. 11, the following describes the switch processing of switching from a still image to a video (Step S19), which is shown in FIG. 5. FIG. 11 is a flowchart of the switch processing of switching from a still image to a video (Step S19), which is shown in FIG. 5.

Based on the start time and end time of the video (posterior video) selected in Step S14, the playback control unit 14 judges whether a time period between the start time and end time of the posterior video includes the reference time (t1) indicated by the time information that is managed by the time management unit 16 (Step S91).

When the time period between the start time and end time of the posterior video includes the reference time t1 (S91: Yes), the playback control unit 14 acquires the posterior video from the disc subdevice 11 via the readout unit 13, and plays back the posterior video from the reference time t1. The display control unit 15 displays, onto the display device 2, the posterior video that is currently played back (Step S92). The time management unit 16 keeps updating the reference time in accordance with the playback of the posterior video by the playback control unit 14.

When the time period between the start time and end time of the posterior video does not include the reference time t1 (S91: No), the playback control unit 14 further judges, based on the start time of the posterior video, whether the recording of the posterior video was started after the reference time t1 (Step S93).

When the recording of the posterior video was started after the reference time t1 (S93: Yes), the time management unit 16 updates the reference time indicated by the time information to the start time of the posterior video (here, the start time of the posterior video is t2) (Step S94). Then, the playback control unit 14 acquires the posterior video from the disc subdevice 11 via the readout unit 13, and plays back the posterior video from the updated reference time t2. The display control unit 15 displays, onto the display device 2, the posterior video that is currently played back (Step S95). The time management unit 16 keeps updating the reference time in accordance with the playback of the posterior video by the playback control unit 14.

When the recording of the posterior video was not started after the reference time t1 (i.e., when the recording of the posterior video was ended before the reference time t1) (S93: No), the time management unit 16 updates the reference time indicated by the time information to the end time of the posterior video (here, the end time of the posterior video is a time t3) (Step S96). Then, the playback control unit 14 acquires the posterior video from the disc subdevice 11 via the readout unit 13 and plays back the posterior video from the updated reference time t3, but pauses the playback of the posterior video at the updated reference time t3. The display control unit 15 displays, onto the display device 2, the posterior video that is paused at the reference time t3 (Step S97). The processing of Step S97 is performed for substantially the same reason as the processing of Step S77. Alternatively, the reference time may be updated in a similar manner to Step S77.

(Specific Examples of Image Switch Processing)

Figure 14:
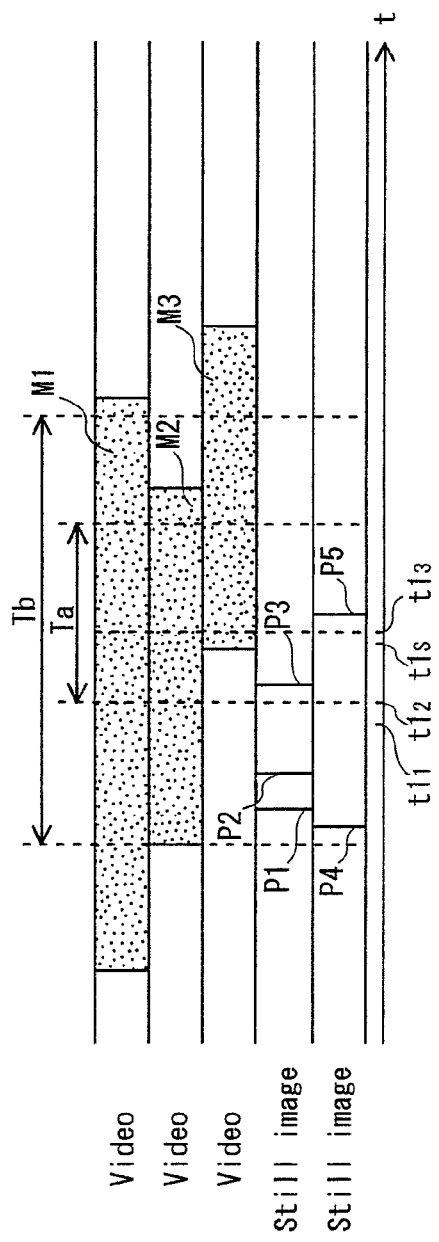
FIG. 14 shows yet another specific example of the image switch processing performed by the image playback device of FIG. 1.

With reference to FIGS. 12 through 14, the following explains specific examples of the image switch processing performed by the image playback device 1 of FIG. 1. In FIGS. 12 through 14, each of the hatched areas represents a time period between the start time and end time of a video M1, M2 or M3. These videos M1 to M3 were recorded using different imaging devices. A set of still images P1 to P3 and a pair of still images P4 and P5 were taken using different imaging devices as well.

{Switching from Video to Another Video}

With reference to FIG. 12, the following describes an operation performed by the image playback device 1 in a case where the image switch button 3e is held down at the reference time $t1_1$ during playback of the video M1.

Assume that the user held down the image switch button 3e at the reference time $t1_1$ during playback of the video M1. The search unit 17 sets a time range Ta, searches for videos from the time range Ta, and creates a video list showing the videos M1, M2 and M3 in listed order. Likewise, the search unit 17 sets a time range Tb, searches for still images from the time range Tb, and creates a still image list. The search unit 17 then selects, as a posterior video, the video M2 that is listed immediately after the currently played video M1 on the video list. The playback control unit 14 plays back the video M2 from the reference time $t1_1$.

{Switching from Video to Another Video}

With reference to FIG. 13, the following describes an operation performed by the image playback device 1 in a case where, after the video M1 is switched to the video M2, the image switch button 3e is held down at the reference time $t1_2$ during playback of the video M2.

Assume that the user held down the image switch button 3e at the reference time $t1_2$ during the playback of the video M2. The search unit 17 sets a time range Ta, searches for videos from the time range Ta, and creates a video list showing the videos M1, M2 and M3 in listed order. Likewise, the search unit 17 sets a time range Tb, searches for still images from the time range Tb, and creates a still image list. The search unit 17 then selects, as a posterior video, the video M3 that is listed immediately after the video M2 (currently played back) on the video list. The time management unit 16 updates the reference time to a time $t1_s$, which is the start time of the video M3. The playback control unit 14 plays back the video M3 from the updated reference time $t1_s$.

{Switching from Video to Sill Image}

With reference to FIG. 14, the following describes an operation performed by the image playback device 1 in a case where, after the video M2 is switched to the video M3, the image switch button 3e is held down at a reference time $t1_3$ during the playback of the video M3.

Assume that the user held down the image switch button 3e at the reference time $t1_3$ during the playback of the video M3. The search unit 17 sets a time range Ta, searches for videos from the time range Ta, and creates a video list showing the videos M1, M2 and M3 in listed order. Likewise, the search unit 17 sets a time range Tb, searches for still images from the time range Tb, and creates a still image list showing the still images P5, P3, P2, P1 and P4 in listed order. The search unit 17 selects, as a posterior still image, the still image P5 which is the first still image on the still image list. The time management unit 16 leaves the reference time $t1_3$ unchanged. The playback control unit 14 plays back the still image P5.

From then on, each time the user holds down the image switch button 3e, the still images are switched one at a time, one after another; namely, P5 to P3, P3 to P2, P2 to P1, and P1 to P4. Here, each time the image switch is performed, the time management unit 16 leaves the reference time unchanged. That is, the reference time remains as $t1_3$.

{Switching from Still Image to Video}

With reference to FIG. 14, the following describes an operation performed by the image playback device 1 in a case where, after the still image P1 is switched to the still image P4, the image switch button 3e is held down during the playback of the still image P4. Note, when the image switch button 3e is held down, the reference time is $t1_3$.

Assume that the user held down the image switch button 3e during the playback of the still image P4. The search unit 17 sets a time range Ta, searches for videos from the time range Ta, and creates a video list showing the videos M1, M2 and M3 in listed order. Likewise, the search unit 17 sets a time range Tb, searches for still images from the time range Tb, and creates a still image list showing the still images P5, P3, P2, P1 and P4 in listed order. The search unit 17 selects, as a posterior video, the video M1 which is the first video on the video list. The playback control unit 14 plays back the video M1 from the reference time $t1_3$. Note, the reference time $t1_3$ is a time at which (i) the playback of the video M3 was stopped and (ii) the playback of the video M1 was resumed. That is to say, the videos M3 and M1 are played back sequentially in terms of time.

<Effects>

When performing the image switch, the above image playback device 1 searches for videos and still images from time ranges Ta and Tb that both include a reference time. This way the image playback device 1 can switch to playback of a video or a still image whose imaging time is close to the reference time. The above image playback device 1 is therefore user-friendly.

The image playback device 1 searches for still images from the time range Tb. This way, the image playback device 1 can effectively search for still images none of which has a temporal range. Furthermore, the time range Ta, from which videos are searched for, may extend longer in the newer direction than in the older direction. This way, in a case where the imaging time of a posterior video or still image precedes the imaging time of an anterior video or still image, the image switch would cause little discomfort to the user's eyes. Furthermore, the time range Tb, from which still images are searched for, may be longer than the time range Ta, from which videos are searched for. This makes it easier for the image playback device 1 to switch to a still image whose imaging time does not have a temporal range.

When switching from a video to a still image, or when switching from a still image to another still image, the image playback device 1 does not update the reference time. When switching from a still image to a video, the image playback device 1 plays back the video from the reference time. This makes it possible to play back a single video or different videos sequentially in terms of time.

<<Embodiment 2>>

Figure 15:
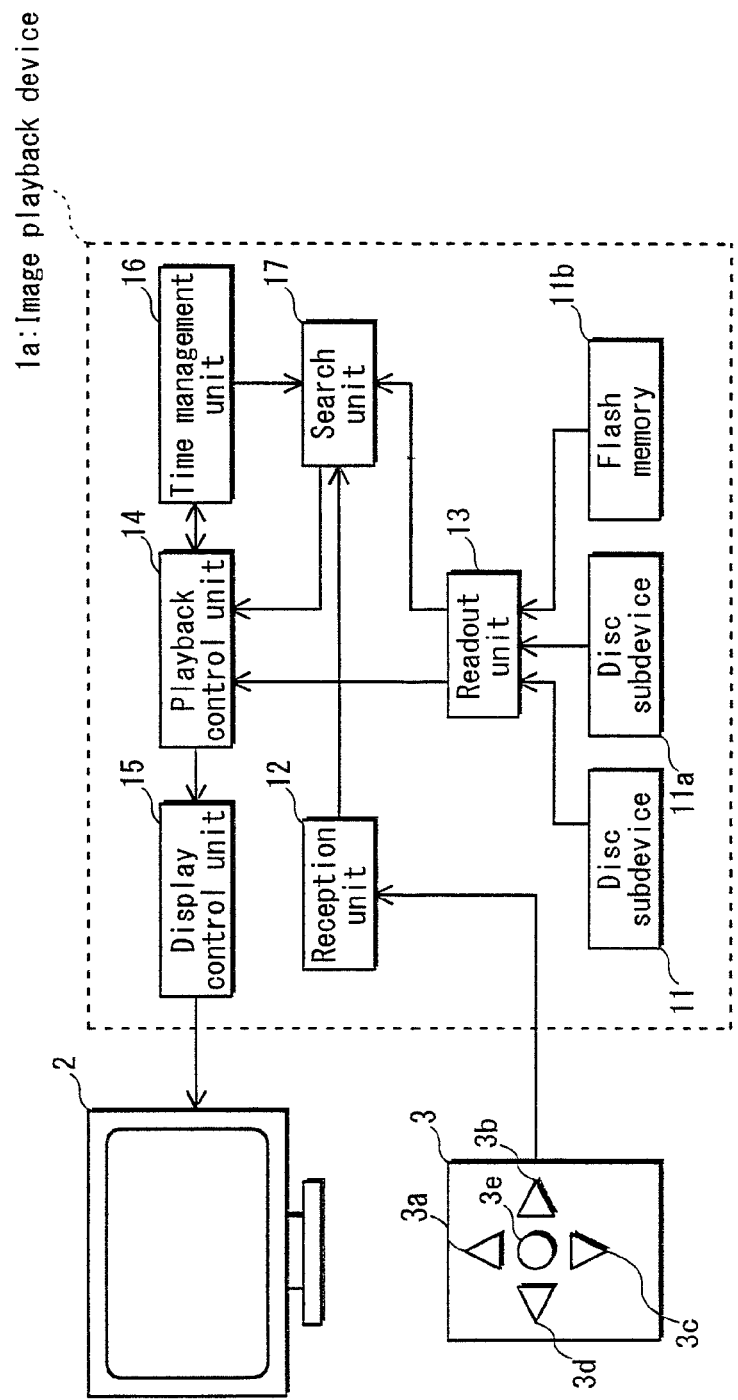
FIG. 15 is a structural diagram of an image playback device pertaining to Embodiment 2.

With reference to FIG. 15, the following describes an image playback device 1a pertaining to Embodiment 2. FIG. 15 is a structural diagram of the image playback device 1a. Below, the constituent elements of the image playback device 1a that are substantially the same as those of the image playback device 1 (pertaining to Embodiment 1) are given the same reference numbers, and since the description in Embodiment 1 is applicable, such description is omitted in Embodiment 2.

The image playback device 1a includes, in addition to a disc subdevice 11, a disc subdevice 11a and a flash memory 11b. Here, however, the number of disc subdevices is not limited to two. Similarly, the image playback device 1a may include more than one flash memories. Also, the flash memory 11b may be replaced with CD-ROM.

The disc subdevice 11a stores therein (i) one or more videos and still images taken by a digital camcorder, a digital camera, etc., and (ii) for each of the videos and still images stored, image information including an imaging time at which the video or still image was taken, etc. Videos and still images may be stored into the disc subdevice 11a in a similar manner as they are stored into the disc subdevice 11.

The flash memory 11b is a removable flash memory such as an SD card and a CompactFlash®. The flash memory 11b stores therein (i) one or more videos and still images taken by a digital camcorder, a digital camera, etc., and (ii) for each of the videos and still images stored, image information including an imaging time at which the video or still image was taken, etc.

A readout unit 13 can read out the videos, still images and image information pieces not only from the disc subdevice 11, but also from the disc subdevice 11a and the flash memory 11b. These videos and still images stored in the disc subdevices 11 and 11a and the flash memory 11b are targets of the search conducted by a search unit 17. A playback control unit 14 plays back the videos and still images stored in the disc subdevices 11 and 11a and the flash memory 11b, in accordance with results of the search conducted by the search unit 17.

The image playback device 1a structured in the above manner can not only play back but also switch between the videos and still images stored in the disc subdevices 11 and 11a and the flash memory 11b. For example, if the flash memory 11b was previously attached to another device (e.g., a digital camera) as a storage for storing still images and the like taken by this device, the image playback device 1a can play back or switch between these still images and the like without transferring them from the flash memory 11b to the disc subdevices 11 and 11a.

<<Embodiment 3>>

Figure 16:
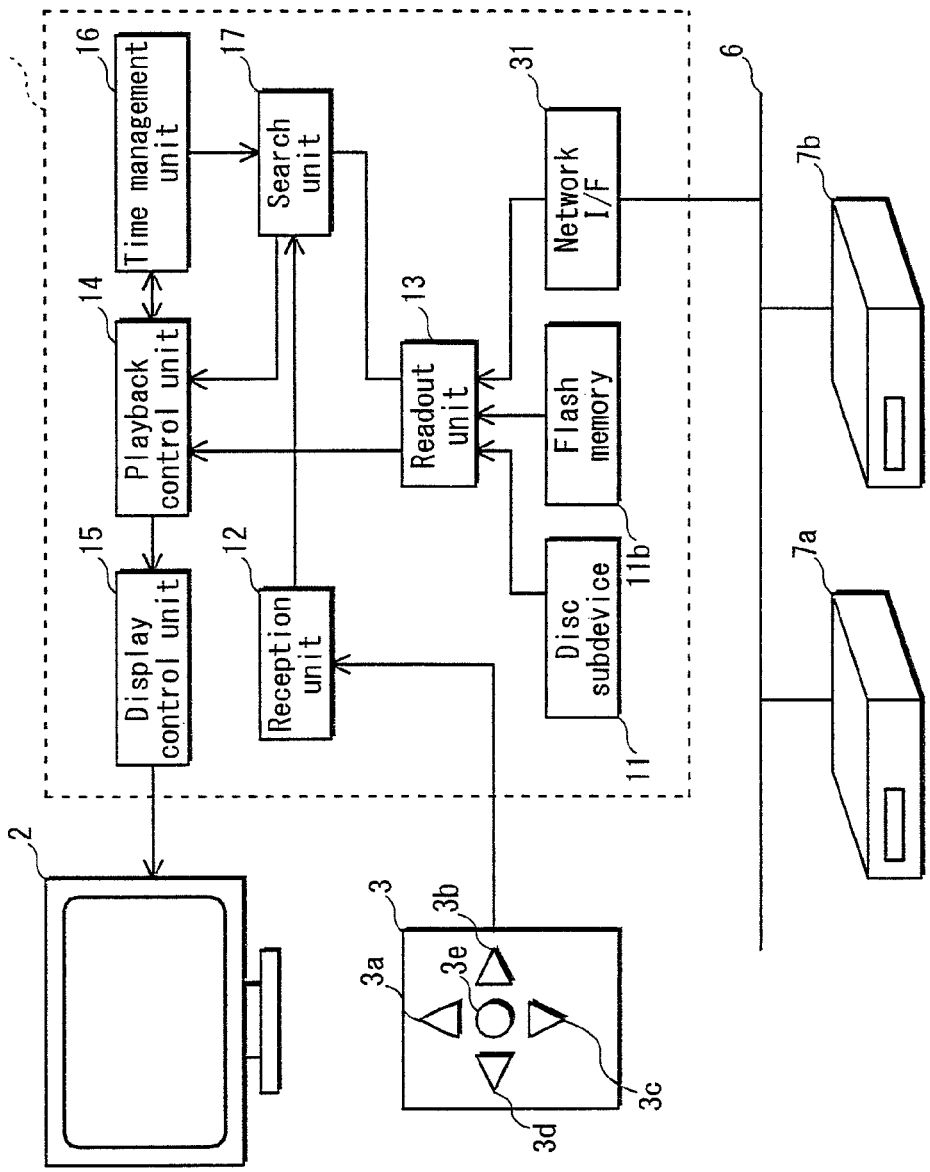
FIG. 16 is a structural diagram of an image playback device pertaining to Embodiment 3.

With reference to FIG. 16, the following describes an image playback device 1b pertaining to Embodiment 3. FIG. 16 is a structural diagram of the image playback device 1b. Below, the constituent elements of the image playback device 1b that are substantially the same as those of the image playback devices 1 and 1a (pertaining to Embodiments 1 and 2) are given the same reference numbers, and since the descriptions in Embodiments 1 and 2 are applicable, such descriptions are omitted in Embodiment 3.

The image playback device 1b additionally includes a flash memory 11b and a network interface (network I/F) 31 for connecting to a network 6. Video decoders 7a and 7b are connected to the network 6. Each of the video decoders 7a and 7b stores therein (i) one or more videos and still images and (ii) for each of the videos and still images stored, image information including an imaging time at which the video or still image was taken, etc. The number of video decoders is not limited to two, but may be one, or three or more. Furthermore, a device connected to the image playback device 1b via the network 6 is not limited to being a video decoder. Such a device may be any device that can (i) store therein videos and still images and (ii) be accessed from the image playback device 1b via the network 6. Such a device may be, for example, a media server and a personal computer.

A readout unit 13 can read out the videos, still images and image information pieces not only from the disc subdevice 11 and the flash memory 11b, but also from the video decoders 7a and 7b connected to the network I/F 31 via the network 6. These videos and still images stored in the disc subdevice 11, flash memory 11b and video decoders 7a and 7b are targets of the search conducted by a search unit 17. A playback control unit 14 plays back the videos and still images stored in the disc subdevice 11, flash memory 11b and video decoders 7a and 7b, in accordance with results of the search conducted by the search unit 17.

The above image playback device 1b can not only play back but also switch between the videos and still images stored in the disc subdevice 11, the flash memory 11b, and the video decoders 7a and 7b connected to the network 6.

<<Embodiment 4>>

The following describes Embodiment 4 with reference to the drawings. Below, the constituent elements pertaining to Embodiment 4 that are substantially the same as those pertaining to Embodiment 1 are given the same reference numbers, and since the description in Embodiment 1 is applicable, such description is omitted in Embodiment 4.

<Structure of Image Playback Device>

Figure 17:
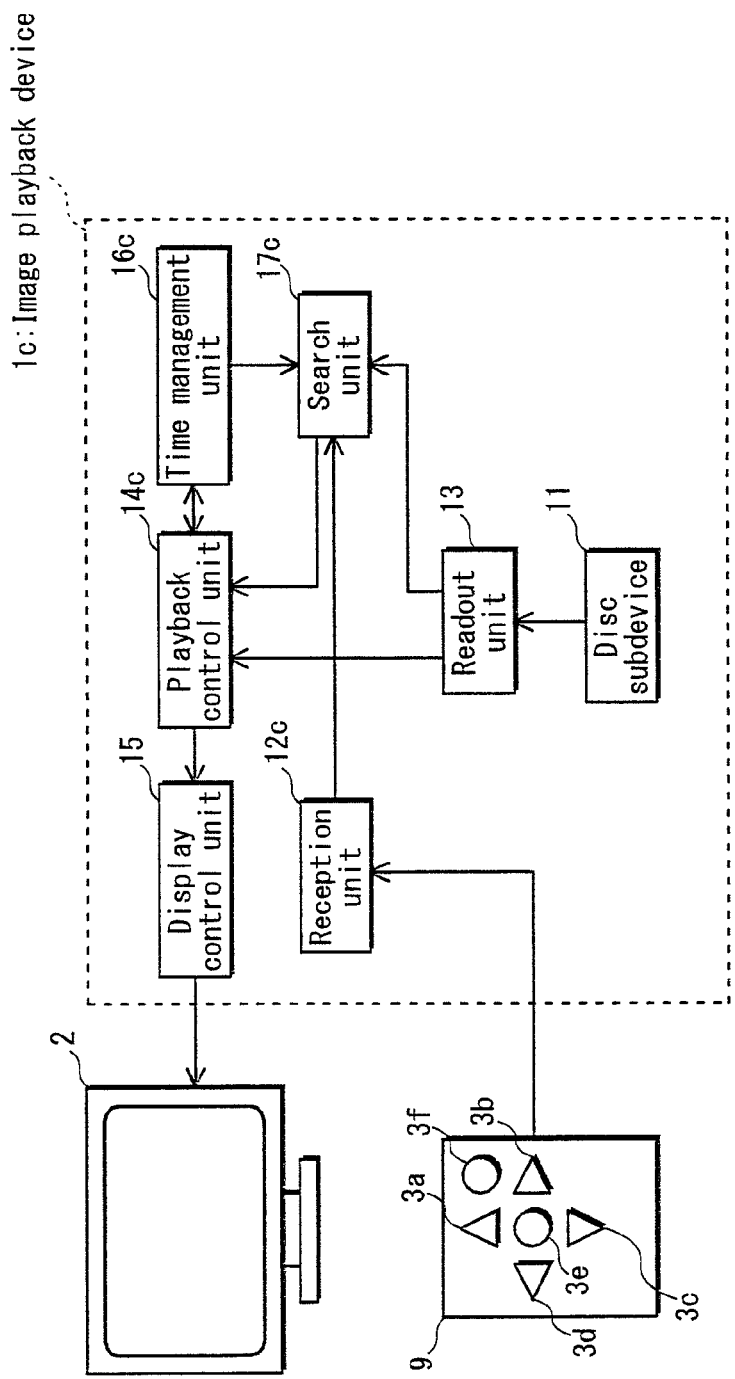
FIG. 17 is a structural diagram of an image playback device pertaining to Embodiment 4.

With reference to FIG. 17, the following describes the structure of an image playback device 1c pertaining to the present embodiment. FIG. 17 is a structural diagram of the image playback device 1c.

A remote control 9 is a device used by a user to perform various operations, such as (i) starting/stopping playback of a video or still image and (ii) performing image switch. The remote control 9 has various buttons including four-way pushbuttons 3a through 3d, a center button 3e, and a mode switch button 3f. The remote control 9 transmits a hold-down signal indicating specifics of a button that has been held down. The hold-down signal is received by the image playback device 1c. For the sake of simple explanation, the center button 3e, the right pushbutton 3b and the left push button 3d are respectively referred to as a "switch/confirmation button", "forward button" and "reverse button" while the image playback device 1c is playing back a video or still image.

The image playback device 1c includes: a disc subdevice 11; a reception unit 12c; a readout unit 13; a playback control unit 14c; a display control unit 15; a time management unit 16c; and a search unit 17c. Here, CPU integrally performs functions of the reception unit 12c, the readout unit 13, the playback control unit 14c, the display control unit 15, the time management unit 16c and the search unit 17c by, for example, (i) reading out a program associated with the image playback and image switch, and (ii) executing the read program. Specifics of processing performed by the reception unit 12c, the readout unit 13, the playback control unit 14c, the display control unit 15, the time management unit 16c and the search unit 17c will be explained in the following <Operations of Image Playback Device>section.

<Operations of Image Playback Device>

Operations performed by the image playback device 1c of FIG. 17 are substantially the same as those performed by the image playback device 1 of Embodiment 1, except that, during playback of a video or still image, the playback device 1c performs image switch processing differently than the image playback device 1. Therefore, in the present embodiment, a description is given of the image switch processing performed by the image playback device 1c.

(Image Switch Processing)

Figure 18:
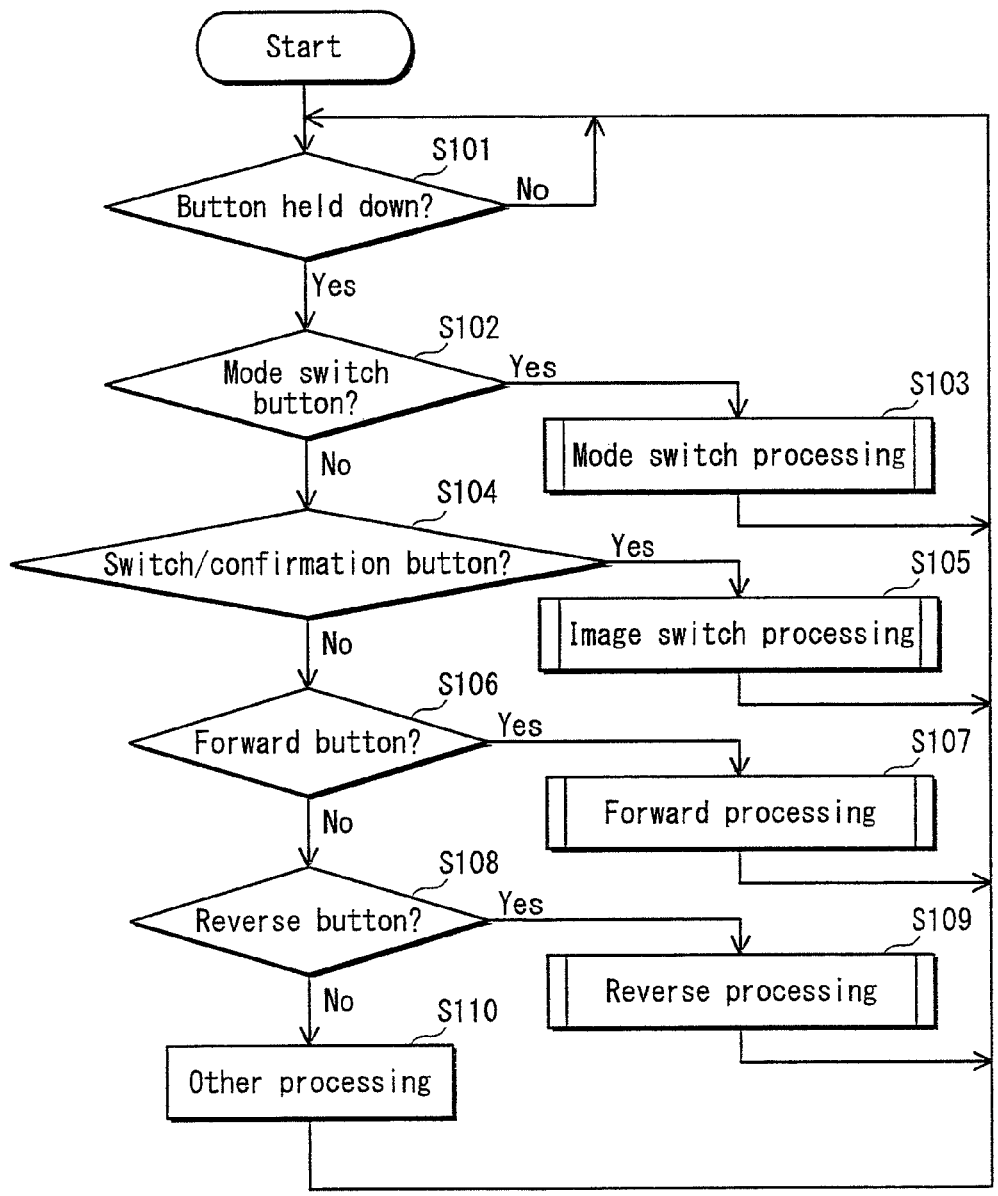
FIG. 18 is a flowchart of image switch processing performed by the image playback device of FIG. 17.

With reference to FIG. 18, the following describes image switch processing performed by the image playback device 1c of FIG. 17. FIG. 18 is a flowchart of the image switch processing performed by the image playback device 1c of FIG. 17.

The reception unit 12c judges whether the user has held down a button on the remote control 9, i.e., whether it has received a hold-down signal from the remote control 9 (Step S101). The reception unit 12c repeats the processing of Step S101 until the user holds down a button on the remote control 9 (S101: No). When judging that the user has held down a button (S101: Yes), the reception unit 12c further judges, based on the received hold-down signal, whether the button held down by the user is the mode switch button 3f (Step S102).

When the button held down by the user is the mode switch button 3f (S102: Yes), the image playback device 1c performs mode switch processing (Step S103). On the other hand, when the button held down by the user is not the mode switch button 3f (S102: No), the reception unit 12c further judges whether the button held down by the user is the switch/confirmation button 3e (Step S104). When the button held down by the user is the switch/confirmation button 3e (S104: Yes), the image playback device 1c performs the image switch processing (Step S105). On the other hand, when the button held down by the user is not the switch/confirmation button 3e (S104: No), the reception unit 12c further judges whether the button held down by the user is the forward button 3b (Step S106).

When the button held down by the user is the forward button 3b (S106: Yes), the image playback device 1c performs forward processing (Step S107). On the other hand, when the button held down by the user is not the forward button 3b (S106: No), the reception unit 12c further judges whether the button held down by the user is the reverse button 3d (Step S108). When the button held down by the user is the reverse button 3d (S108: Yes), the image playback device 1c performs reverse processing (Step S109). On the other hand, when the button held down by the user is not the reverse button 3d (S108: No), the image playback device 1c performs processing according to the button held down by the user (Step S110).

{Mode Switch Processing}

Figure 19:
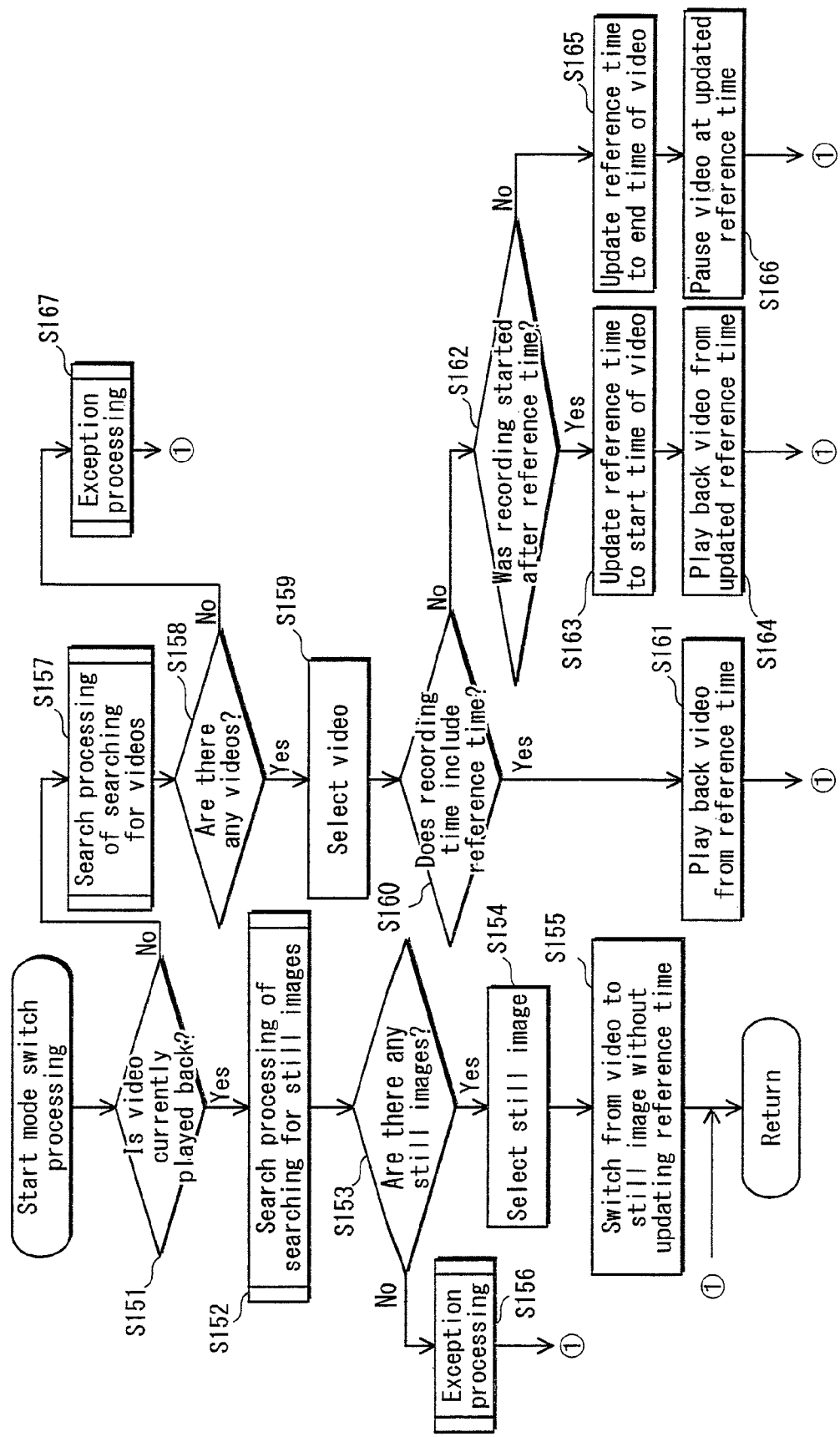
FIG. 19 is a flowchart of mode switch processing shown in FIG. 18.

With reference to FIG. 19, the following explains the mode switch processing (Step S103) shown in FIG. 18. FIG. 19 is a flowchart of the mode switch processing (Step S103) shown in FIG. 18.

The reception unit 12c issues a mode switch instruction to the search unit 17c. Upon receiving the mode switch instruction, the search unit 17c judges whether a video is currently played back (Step S151).

When judging that a video is currently played back (S151: Yes), the search unit 17c sets a time range Tb, searches for still images from the time range Tb, and creates a still image list (Step S152). Here, the processing of Step S152 may be substantially the same as the processing of Steps S34 through S36 shown in FIG. 6.

The search unit 17c judges whether the still image list shows any still images (Step S153). When the still image list shows one or more still images (S153: Yes), the search unit 17c selects, as a posterior still image, the first still image on the still image list (Step S154). The time management unit 16c does not update the reference time indicated by the time information to the imaging time of the posterior still image, i.e., the reference time remains as the imaging time of, from among frames constituting the video, a frame that had been played back immediately before the image switch. The playback control unit 14c acquires the posterior still image from the disc subdevice 11 via the readout unit 13, and plays back the posterior still image. The display control unit 15 displays, onto the display device 2, the posterior still image that is currently played back (Step S155).

When the still image list shows no still images (S153: No), the image playback device 1c performs exception processing (Step S156). The exception processing is processing of displaying, onto the display device 2, a notification indicating that there are no playable still images. It should be noted that the exception processing is not limited to this. For example, the following combination maybe performed as the exception processing: (i) displaying, onto the display device 2, a notification indicating that the currently played video is going to be switched to a still image whose imaging time is not included in the time range Tb; and (ii) after the user has held down the switch/confirmation button 3e, switching to, from among all the still images whose imaging times are not included in the time range Tb, a still image whose imaging time is closest to the reference time.

When judging that a video is not currently played back (i.e., a still image is currently played back) (S151: No), the search unit 17c sets a time range Ta, searches for videos from the time range Ta, and creates a video list (Step S157). Here, the processing of Step S157 may be substantially the same as the processing of Steps S31 through S33 shown in FIG. 6.

The search unit 17c judges whether the video list shows any videos (Step S158). When the video list shows one or more videos (S158: Yes), the search unit 17c selects, as a posterior video, the first video on the video list (Step S159). Then, with reference to the start time and end time included in the image information of the posterior video, the playback control unit 14c judges whether the time period between the start time and end time of the posterior video includes the reference time (here, a time t1) indicated by the time information managed by the time management unit 16c (Step S160).

When said time period includes the reference time t1 (S160: Yes), the playback control unit 14c acquires the posterior video from the disc subdevice 11 via the readout unit 13, and plays back the posterior video from the reference time t1. The display control unit 15 displays, onto the display device 2, the posterior video that is currently played back (Step S161). Here, the time management unit 16c keeps updating the reference time in accordance with the playback of the posterior video by the playback control unit 14c.

When said time period does not include the reference time t1 (S160: No), the playback control unit 14c judges, with reference to the start time of the posterior video, whether recording of the posterior video was started after the reference time t1 (Step S162).

When the recording of the posterior video was started after the reference time t1 (S162: Yes), the time management unit 16c updates the reference time indicated by the time information to the start time (here, a time t2) of the posterior video (Step S163). The playback control unit 14c acquires the posterior video from the disc subdevice 11 via the readout unit 13, and plays back the posterior video from the updated reference time t2. The display control unit 15 displays, onto the display device 2, the posterior video that is currently played back (Step S164). Here, the time management unit 16c keeps updating the reference time in accordance with the playback of the posterior video by the playback control unit 14c.

When the recording of the posterior video was not started after the reference time t1, i.e., when the recording of the posterior video was ended before the reference time t1 (S162: No), the time management unit 16c updates the reference time indicated by the time information to the end time (here, a time t3) of the posterior video (Step S165). The playback control unit 14c acquires the posterior video from the disc subdevice 11 via the readout unit 13 and plays back the posterior video from the updated reference time t3, but pauses the playback of the posterior video at the updated reference time t3. The display control unit 15 displays, onto the display device 2, the posterior video that is paused at the reference time t3 (Step S166).

When the video list shows no videos (S158: No), the image playback device 1c performs exception processing (Step S167). This exception processing may be substantially the same as, for example, the exception processing of Step S156, although the former is associated with videos while the latter is associated with still images.

{Image Switch Processing}

Figure 20:
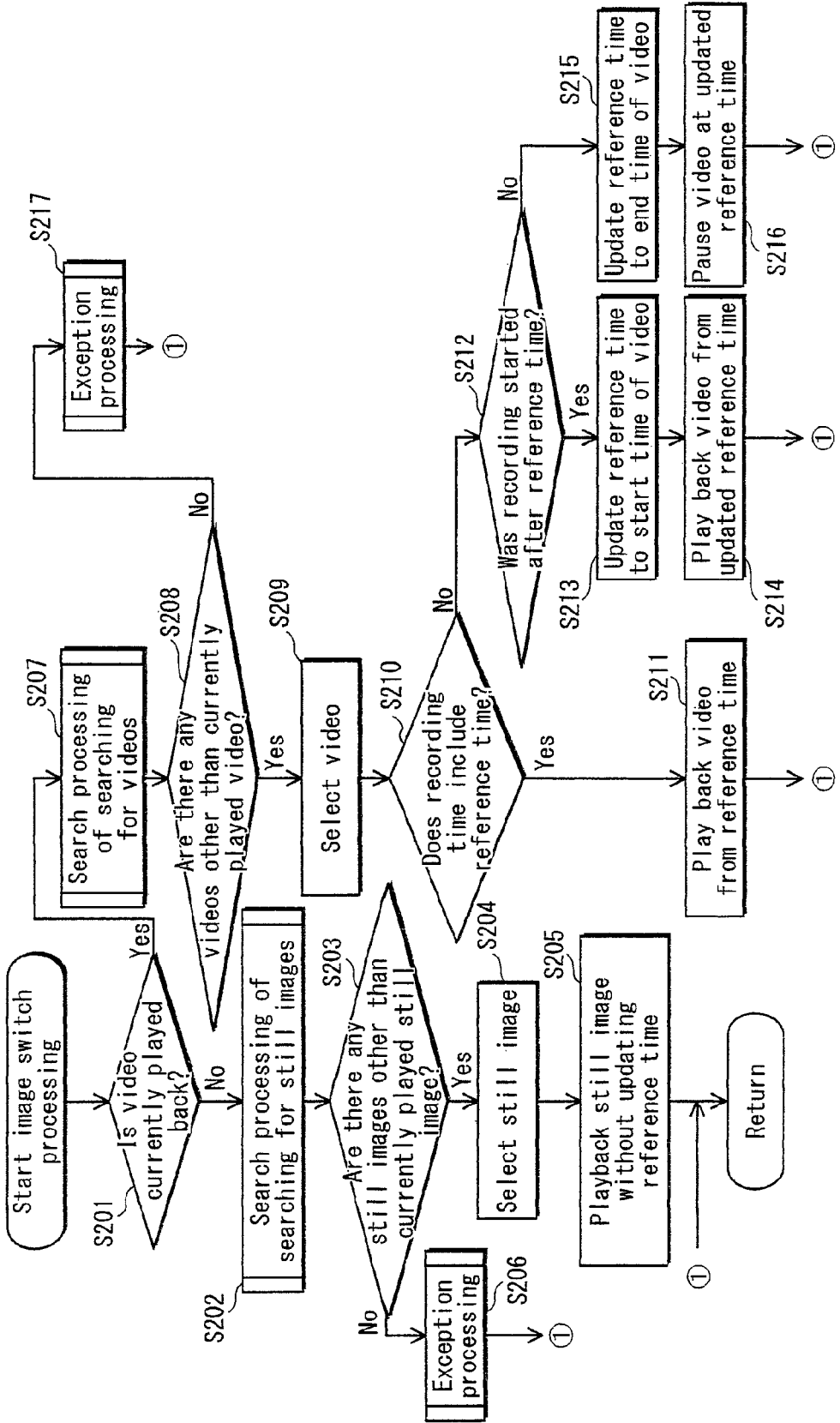
FIG. 20 is a flowchart of image switch processing shown in FIG. 18.

With reference to FIG. 20, the following explains the image switch processing (Step S105) shown in FIG. 18. FIG. 20 is a flowchart of the image switch processing (Step S105) shown in FIG. 18.

The reception unit 12c issues an image switch instruction to the search unit 17c. Upon receiving the image switch instruction, the search unit 17c judges whether a video is currently played back (Step S201).

When judging that a video is not currently played back (i.e., a still image is currently played back) (S201: No), the search unit 17c sets a time range Tb, searches for still images from the time range Tb, and creates a still image list (Step S202). Here, the processing of Step S202 may be substantially the same as the processing of Steps S34 through S36 shown in FIG. 6.

The search unit 17c judges whether the still image list shows any still images other than the currently played still image (Step S203). When the still image list shows one or more still images other than the currently played still image (S203: Yes), the search unit 17c selects, as a posterior still image, a still image that is immediately after the currently played still image on the still image list (or the first still image on the still image list, if the currently played still image is the last still image on the still image list) (Step S204). The time management unit 16c does not update the reference time indicated by the time information to the imaging time of the posterior still image—that is, the reference time remains the same before/after the image switch. The playback control unit 14c acquires the posterior still image from the disc subdevice 11 via the readout unit 13, and plays back the posterior still image. The display control unit 15 displays, onto the display device 2, the posterior still image that is currently played back (Step S205).

When the still image list does not show any still images other than the currently played still image (S203: No), the image playback device 1c performs exception processing (Step S206). This exception processing may be substantially the same as, for example, the exception processing of Step S156.

When judging that a video is currently played back (Step S201: Yes), the search unit 17c sets a time range Ta, searches for videos from the time range Ta, and creates a video list (Step S207). Here, the processing of Step S207 may be substantially the same as the processing of Steps S31 through S33 shown in FIG. 6.

The search unit 17c further judges whether the video list shows any videos other than the currently played video (Step S208). When the video list shows one or more videos other than the currently played video (S208: Yes), the search unit 17c selects, as a posterior video, a video that is immediately after the currently played video on the video list (or the first video on the video list, if the currently played video is the last video on the video list) (Step S209). With reference to the start time and end time included in the image information of the posterior video, the playback control unit 14c judges whether the time period between the start time and end time of the posterior video includes the reference time (here, a time t1) indicated by the time information managed by the time management unit 16c (Step S210).

When said time period includes the reference time t1 (S210: Yes), the playback control unit 14c acquires the posterior video from the disc subdevice 11 via the readout unit 13, and plays back the posterior video from the reference time t1. The display control unit 15 displays, onto the display device 2, the posterior video that is currently played back (Step S211). The time management unit 16c keeps updating the reference time in accordance with the playback of the posterior video by the playback control unit 14c.

When said time period does not include the reference time t1 (S210: No), the playback control unit 14c judges, with reference to the start time of the posterior video, whether recording of the posterior video was started after the reference time t1 (Step S212).

When the recording of the posterior video was started after the reference time t1 (S212: Yes), the time management unit 16c updates the reference time indicated by the time information to the start time (here, a time t2) of the posterior video (Step S213). The playback control unit 14c acquires the posterior video from the disc subdevice 11 via the readout unit 13, and plays back the posterior video from the updated reference time t2. The display control unit 15 displays, onto the display device 2, the posterior video that is currently played back (Step S214). Here, the time management unit 16c keeps updating the reference time in accordance with the playback of the posterior video by the playback control unit 14c.

When the recording of the posterior video was not started after the reference time t1, i.e., when the recording of the posterior video was ended before the reference time t1 (S212: No), the time management unit 16c updates the reference time indicated by the time information to the end time (here, a time t3) of the posterior video (Step S215). The playback control unit 14c acquires the posterior video from the disc subdevice 11 via the readout unit 13 and plays back the posterior video from the updated reference time t3, but pauses the playback of the posterior video at the updated reference time t3. The display control unit 15 displays, onto the display device 2, the posterior video that is paused at the reference time t3 (Step S216).

When the video list does not show any videos other than the currently played video (S208: No), the image playback device 1c performs exception processing (Step S217) This exception processing may be substantially the same as, for example, the exception processing of Step S156, although the former is associated with videos while the latter is associated with still images.

{Forward Processing}

Figure 21:
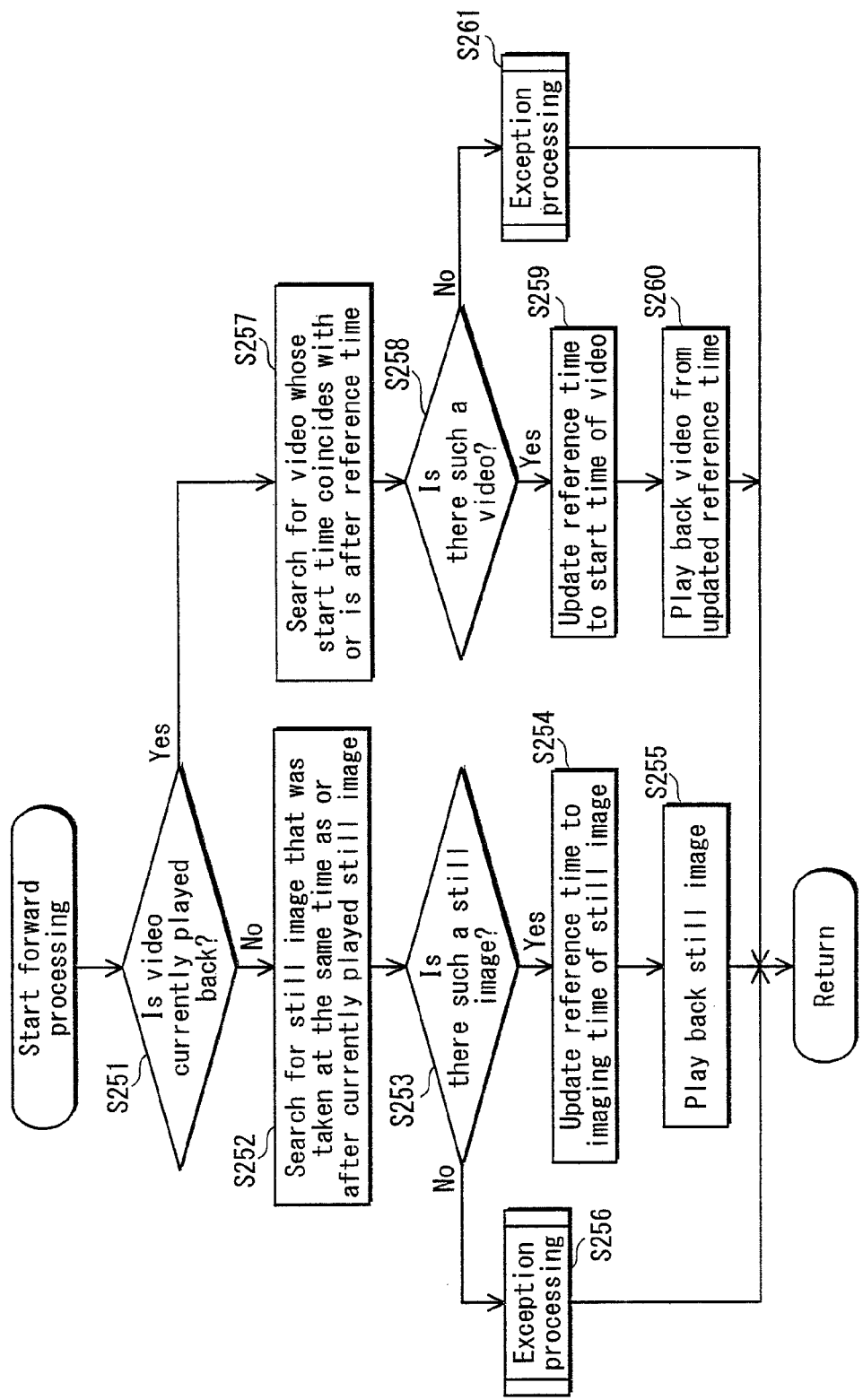
FIG. 21 is a flowchart of forward processing shown in FIG. 18.

With reference to FIG. 21, the following explains the forward processing (Step S107) shown in FIG. 18. FIG. 21 is a flowchart of the forward processing (Step S107) shown in FIG. 18.

The reception unit 12c issues a forward instruction to the search unit 17c. Upon receiving the forward instruction, the search unit 17c judges whether a video is currently played back (Step S251). When judging that a video is not currently played back (i.e., a still image is currently played back) (S251: No), the search unit 17c searches for, from among all the still images stored in the disc subdevice 11, a still image (posterior still image) that satisfies the following conditions: (i) its imaging time coincides with or is after the imaging time of the currently played still image; and (ii) its imaging time is closest to the imaging time of the currently played still image (Step S252).

When the posterior still image satisfying the above conditions is found (S253: Yes), the time management unit 16c updates the reference time indicated by the time information to the imaging time of the posterior still image (Step S254). The playback control unit 14c acquires the posterior still image from the disc subdevice 11 via the readout unit 13, and plays back the posterior still image. The display control unit 15 displays, onto the display device 2, the posterior still image that is currently played back (Step S255). When the posterior still image satisfying the above conditions is not found (S253: No), the image playback device 1c performs exception processing (Step S256). This exceptional processing may be, for example, processing of notifying the user that there is no still image to be played back after the currently played still image, by displaying a warning message indicating so, or by outputting a warning beep.

When judging that a video is currently played back (S251: Yes), the search unit 17c selects, from among all the videos stored in the disc subdevice 11, a video (posterior video) that satisfies the following conditions: (i) its start time coincides with or is after the reference time indicated by the time information managed by the time management unit 16; and (ii) its start time is closest to the reference time (Step S257).

When the posterior video satisfying the above conditions is found (S258: Yes), the time management unit 16c updates the reference time indicated by the time information to the start time of the posterior video (Step S259). The playback control unit 14c acquires the posterior video from the disc subdevice 11 via the readout unit 13, and plays back the posterior video from the updated reference time. The display control unit 15 displays, onto the display device 2, the posterior video that is currently played back (Step S260). Here, the time management unit 16c keeps updating the reference time in accordance with the playback of the posterior video by the playback control unit 14c. When the posterior video satisfying the above conditions is not found (S258: No), the image playback device 1c performs exception processing (Step S261). This exception processing may be substantially the same as the exception processing of Step S256, although the former is associated with videos while the latter is associated with still images.

{Reverse Processing}

Figure 22:
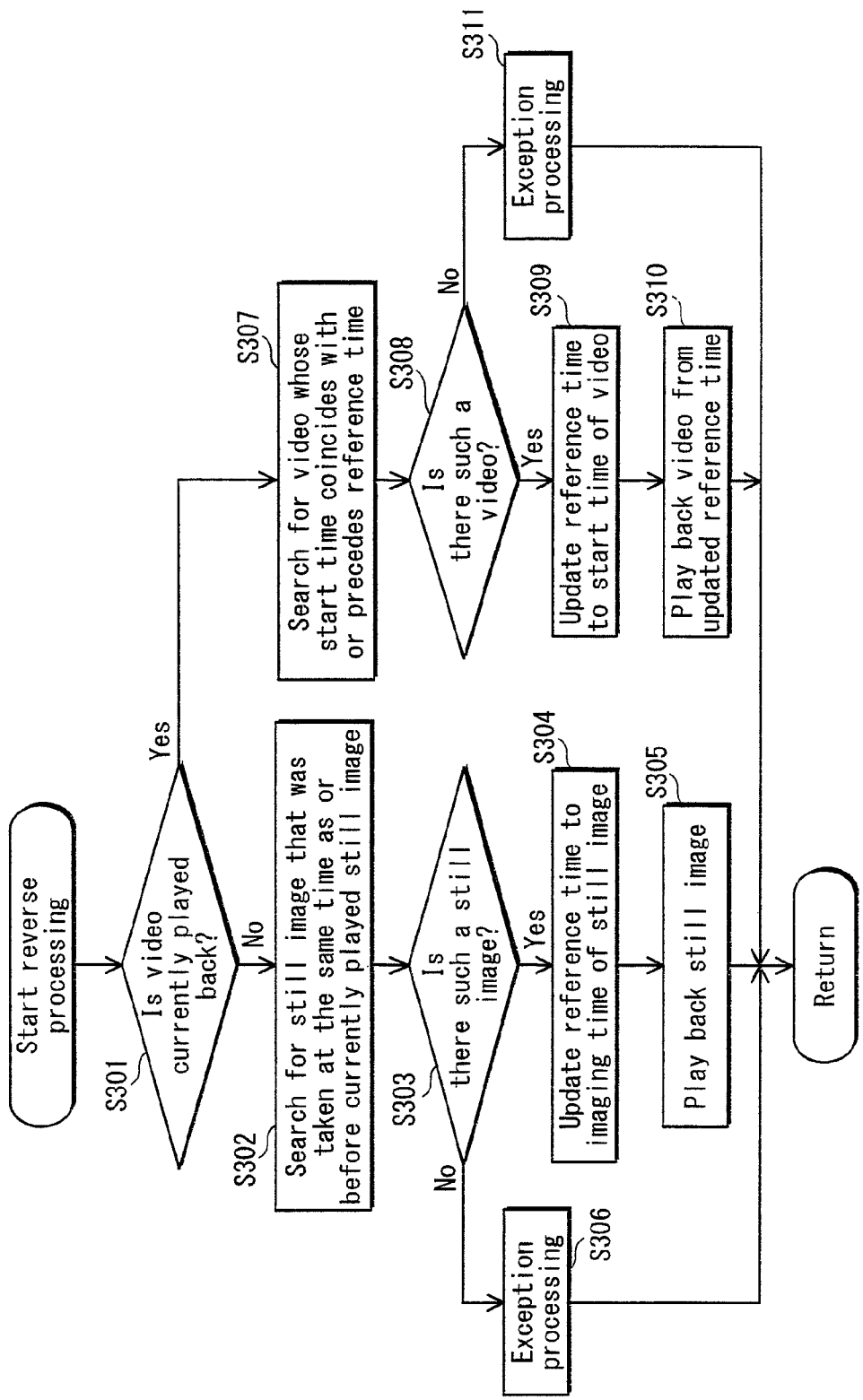
FIG. 22 is a flowchart of reverse processing shown in FIG. 18.

With reference to FIG. 22, the following explains the reverse processing (Step S109) shown in FIG. 18. FIG. 22 is a flowchart of the reverse processing (Step S109) shown in FIG. 18.

The reception unit 12c issues a reverse instruction to the search unit 17c. Upon receiving the reverse instruction, the search unit 17c judges whether a video is currently played back (Step S301). When judging that a video is not currently played back, i.e., a still image is currently played back (S301: No), the search unit 17c searches for, from among all the still images stored in the disc subdevice 11, a still image (posterior still image) that satisfies the following conditions: (i) its imaging time coincides with or precedes the imaging time of the currently played still image; and (ii) its imaging time is closest to the imaging time of the currently played still image (Step S302).

When the posterior still image satisfying the above conditions is found (S303: Yes), the time management unit 16c updates the reference time indicated by the time information to the imaging time of the posterior still image (Step S304). The playback control unit 14c acquires the posterior still image from the disc subdevice 11 via the readout unit 13, and plays back the posterior still image. The display control unit 15 displays, onto the display device 2, the posterior still image that is currently played back (Step S305). When the posterior still image satisfying the above conditions is not found (S303: No), the image playback device 1c performs exception processing (Step S306). This exception processing may be substantially the same as the exception processing of Step S256.

When judging that a video is currently played back (S301: Yes), the search unit 17c searches for, from among all the videos stored in the disc subdevice 11, a video (posterior video) that satisfies the following conditions: (i) its start time coincides with or precedes the reference time indicated by the time information managed by the time management unit 16; and (ii) its start time is closest to the reference time (Step S307). When the posterior video satisfying the above conditions is found (S308: Yes), the time management unit 16c updates the reference time indicated by the time information to the start time of the posterior video (Step S309). The playback control unit 14c acquires the posterior video from the disc subdevice 11 via the readout unit 13, and plays back the posterior video from the updated reference time. The display control unit 15 displays, onto the display device 2, the posterior video that is currently played back (Step S310). Here, the time management unit 16c keeps updating the reference time in accordance with the playback of the posterior video by the playback control unit 14c. When the video satisfying the above conditions is not found (S308: No), the image playback device 1c performs exception processing (Step S311). This exception processing may be substantially the same as the exception processing of Step S256, although the former is associated with videos while the latter is associated with still images.

(Specific Examples of Image Switch Processing)

With reference to FIGS. 23 through 33, the following describes specific examples of the image switch processing performed by the image playback device 1c of FIG. 17. In FIGS. 23 through 33, each of m1 through m3 is a video, and each of p1 through p5 is a still image. Hatched areas represent time periods during which the videos m1 through m3 were recorded. In FIGS. 23 through 33, a time range Ta represents a time range from which videos are searched for, and a time range Tb represents a time range from which still images are searched for.

{Image Switch Processing: Switching from Video to Another Video}

Figure 23:
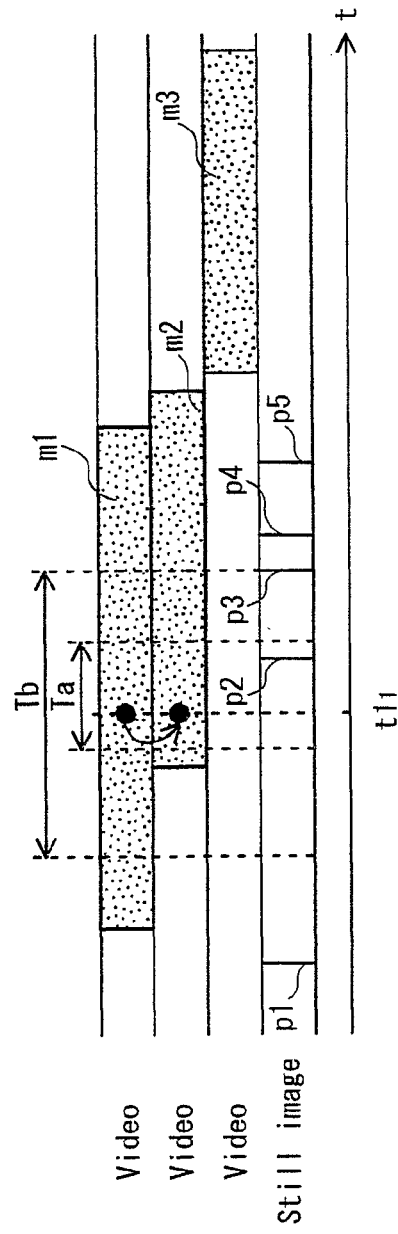
FIG. 23 shows a specific example of the image switch processing performed by the image playback device of FIG. 17.

With reference to FIG. 23, the following explains an operation performed by the image playback device 1c when the switch/confirmation button 3e is held down during playback of the video m1 at a reference time $t1_1$.

Assume that the user held down the switch/confirmation button 3e during the playback of the video m1 at the reference time $t1_1$. The search unit 17c sets a time range Ta, searches for videos from the time range Ta, and creates a video list showing the videos m1 and m2 in listed order. Then, the search unit 17c selects the video m2 that is immediately after the currently played video m1 on the video list. The playback control unit 14c plays back the video m2 from the reference time $t1_1$.

{Image Switch Processing: Switching from Video to Another Video}

Figure 24:
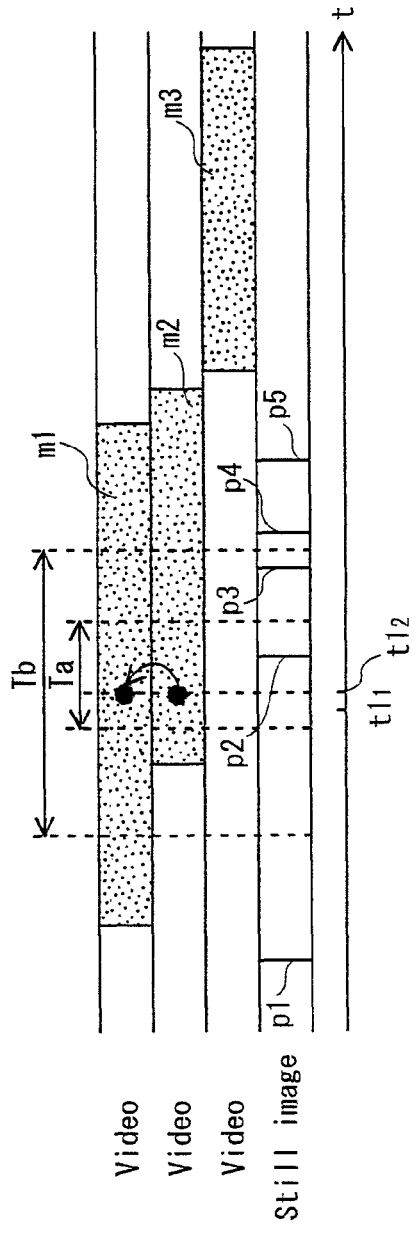
FIG. 24 shows another specific example of the image switch processing performed by the image playback device of FIG. 17.

With reference to FIG. 24, the following explains an operation performed by the image playback device 1c when the switch/confirmation button 3e is held down during the playback of the video m2 at a reference time $t1_2$, after the playback of the video m1 was switched to the playback of the video m2.

Assume that the user held down the switch/confirmation button 3e during the playback of the video m2 at the reference time $t1_2$. The search unit 17c sets a time range Ta, searches for videos from the time range Ta, and creates a video list showing the videos m1 and m2 in listed order. Then, since the video m2 is the last video on the video list, the search unit 17c selects the video m1 which is the first video on the video list. The playback control unit 14c plays back the video m1 from the reference time $t1_2$.

{Image Switch Processing: Switching from Video to Another Video}

With reference to FIG. 25, the following explains an operation performed by the image playback device 1c when the switch/confirmation button 3e is held down during the playback of the video m2 at a reference time $t1_3$, after the playback of the video m1 was switched to the playback of the video m2.

Assume that the user held down the switch/confirmation button 3e during the playback of the video m2 at the reference time $t1_3$. The search unit 17c sets a time range Ta, searches for videos from the time range Ta, and creates a video list showing the videos m1, m2 and m3 in listed order. Then, the search unit 17c selects the video m3 that listed immediately after the currently played video m2 on the video list. The time management unit 16c updates the reference time to a time $t1_s$, which is the start time of the video m3. The playback control unit 14c plays back the video m3 from the updated reference time $t1_s$.

{Mode Switch Processing: Switching from Video to Still Image}

With reference to FIG. 26, the following explains an operation performed by the image playback device 1c when the mode switch button 3f is held down during the playback of the video m2 at a reference time $t1_4$, after the playback of the video m1 is switched to the video m2.

Assume that the user held down the mode switch button 3f during the playback of the video m2 at the reference time $t1_4$. The search unit 17c sets a time range Tb, searches for still images from the time range Tb, and creates a still image list showing the still images p2, p3 and p4 in listed order. Then, the search unit 17c selects the still image p2, which is the first still image on the still image list. The time management unit 16c does not update the reference time, i.e., the reference time remains as $t1_4$. The playback control unit 14c plays back the still image p2.

{Mode Switch Processing: Switching from Still Image to Video}

With reference to FIG. 27, the following explains an operation performed by the image playback device 1c when the mode switch button 3f is held down during the playback of the still image p2, after the playback of the video m2 was switched to the playback of the still image p2. Note, when the mode switch button 3f is held down, the reference time is $t1_4$.

Assume that the user held down the mode switch button 3f during the playback of the still image p2. The search unit 17c sets a time range Ta, searches for videos from the time range Ta, and creates a video list showing the videos m1 and m2 in listed order. Then, the search unit 17c selects the video m1, which is the first video on the video list. The playback control unit 14c plays back the video m1 from the reference time $t1_4$. As described above with reference to FIGS. 26 and 27, after the playback of the video m2 is switched to the playback of the still image p2 and then to the playback of the video m1, the videos m2 and m1 are played back sequentially in terms of time.

{Image Switch Processing: Switching from Still Image to Video}

With reference to FIG. 28, the following explains an operation performed by the image playback device 1c when the switch/confirmation button 3e is held down during the playback of the still image p2, after the playback of the video m2 was switched to the playback of the still image p2. Note, when the switch/confirmation button 3e is held down, the reference time is $t1_4$.

Assume that the user held down the switch/confirmation button 3e during playback of the still image p2. The search unit 17c sets a time range Tb, searches for still images from the time range Tb, and creates a still image list showing the still images p2, p3 and p4 in listed order. The search unit 17c selects the still image p3 that is immediately after the still image p2 on the still image list. The time management unit 16c does not update the reference time, i.e., the reference time remains as $t1_4$. The playback control unit 14c plays back the still image p3.

If the userholds down the switch/confirmation button 3e during the playback of the still image p3, then the search unit 17c will create a still image list showing the still images p2, p3 and p4 in listed order, and selects the still image p4 which is immediately after the still image p3 on the still image list. Consequently, the still image p4 will be played back (FIG. 29). At this time, the time management unit 16c leaves the reference time unchanged, i.e., the reference time remains as $t1_4$. If the user holds down the switch/confirmation button 3e during the playback of the still image p4, then the search unit 17c will create a still image list showing the still images p2, p3 and p4 in listed order, and selects the still image p2 which is the first still image on the still image list. Consequently, the still image p2 will be played back (FIG. 30). At this time, the time management unit 16c leaves the reference time unchanged, i.e., the reference time remains as $t1_4$.

{Reverse Processing: Switching from Still Image to Another Still Image}

With reference to FIG. 31, the following explains an operation performed by the image playback device 1c when the reverse button 3d is held down during the playback of the still image p2, after the playback of the still image p4 was switched to the playback of the still image p2. Note, when the reverse button 3d is held down, the reference time is $t1_4$.

Assume that the user held down the reverse button 3*d* during the playback of the still image p2. The search unit 17*c* searches for a still image that satisfies both of the following conditions: (i) its imaging time coincides with or precedes the imaging time of the still image p2; and (ii) its imaging time is closest to the imaging time of the still image p2. Eventually the search unit 17*c* would find the still image p1. The time management unit 16*c* updates the reference time from $t1_4$ to $t1_5$, which is the imaging time of the still image p1. The playback control unit 14*c* plays back the still image p1. In this manner, if the reverse button 3*d* is held down, the reference time will be updated even though this image switch falls into "image switch processing of switching from a still image to another still image".

{Forward Processing: Switching from Still Image to Another Still Image}

With reference to FIG. 32, the following explains an operation performed by the image playback device 1*c* when the forward button 3*b* is held down during playback of the still image p4, after the playback of the still image p3 was switched to the playback of the still image p4. Note, when the forward button 3*b* is held down, the reference time is $t1_4$.

Assume that the user held down the forward button 3*b* during the playback of the still image p4. The search unit 17*c* searches for a still image that satisfies both of the following conditions: (i) its imaging time coincides with or is after the imaging time of the still image p4; and (ii) its imaging time is closest to the imaging time of the still image p4. Eventually the search unit 17*c* would find the still image p5. The time management unit 16*c* updates the reference time from $t1_4$ to $t1_6$, which is the imaging time of the still image p5. The playback control unit 14*c* plays back the still image p5. In this manner, if the forward button 3*b* is held down, the reference time will be updated even though this image switch falls into "image switch processing of switching from a still image to another still image".

{Mode Switch Processing: Switching from Still Image to Video}

Figure 33:
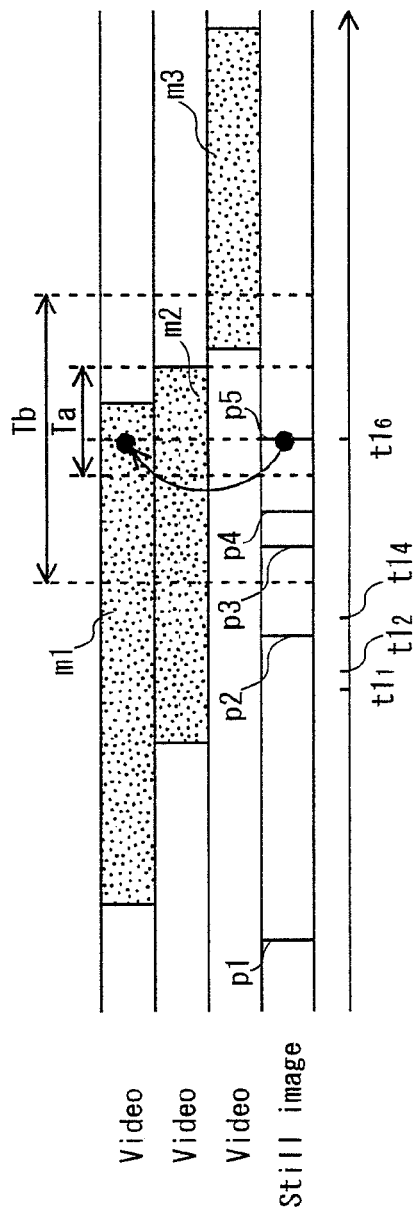
FIG. 33 shows yet another specific example of the image switch processing performed by the image playback device of FIG. 17.

With reference to FIG. 33, the following explains an operation performed by the image playback device 1*c* when the mode switch button 3*f* is held down during the playback of the still image p5, after the playback of the still image p4 was switched to the playback of the still image p5. Note, when the mode switch button 3*f* is held down, the reference time is $t1_6$.

Assume that the user held down the mode switch button 3*f* during the playback of the still image p5. The search unit 17*c* sets a time range Ta, searches for videos from the time range Ta, and creates a video list showing videos m1, m2 and m3 in listed order. Then, the search unit 17*c* selects the video m1, which is the first video on the video list. The playback control unit 14*c* plays back the video m1 from the reference time $t1_6$.

Illustrations of FIGS. 26, 28, 29, 32 and 33 are summarized as follows. When the mode switch button 3*f* is held down at the reference time $t1_4$, the playback of the video m2 is switched to the playback of the still image p2. Thereafter, by holding down the switch/confirmation button 3*e* twice, the playback of the still image p2 is switched to the playback of the still image p3, and then to the playback of the still image p4. Throughout the above process, the reference time remains as $t1_4$. Thereafter, when the forward button 3*b* is held down, the playback of the still image p4 is switched to the playback of the still image p5. At this time, the reference time is updated from $t1_4$ to $t1_6$, which is the imaging time of the still image p5. Thereafter, when the mode switch button 3*f* is held down, the video m1 is played back from the reference time $t1_6$. As set forth above, by holding down the forward button 3*b*, a video would be played back from a time point desired by the user. Likewise, by holding down the reverse button 3*d*, a video would be played back from a time point desired by the user.

<Effects>

According to the above image playback device 1*c*, the time management unit 16*c* updates the reference time indicated by the time information neither when the mode switch button 3*f* is held down during playback of a video, nor when the switch/confirmation button 3*e* is held down during playback of a still image. When a still image is switched to a video, the playback control unit 16*c* plays back the video from the reference time. Hence, the same video, as well as different videos, can be played back sequentially in terms of time.

If the forward button 3*b* or the reverse button 3*d* is held down during playback of a still image, the time management unit 16*c* will update the reference time indicated by the time information to the imaging time of the posterior still image, even though this image switch falls into "image switch processing of switching from a still image to another still image". When a still image is switched to a video, the playback control unit 16*c* plays back the video from the updated reference time. This structure allows the user to intuitively perform the image switch operation.

<<Additional Remarks>>

The present invention is not limited to the above embodiments. The present invention may be carried out in any form as long as the object of the present invention, as well as other objects related/incidental thereto, can be achieved. The following variations may be added.

(1) According to the above embodiments, the imaging time of a video is composed of a pair of (i) a start time at which the recording of the video was started and (ii) an end time at which the recording of the video was ended. However, the imaging time of a video is not limited to being composed of such a pair, but may instead be composed of, for example, a pair of (i) the start time and (ii) a recording time period during which the video was recorded.

(2) According to the above embodiments, videos are searched for from a time range Ta. The present invention, however, is not limited to such a structure. Targets of the search may only include videos whose recording time periods include the reference time indicated by the time information. Alternatively, targets of the search may only include (i) videos whose end times are after the reference time, or (ii) videos whose start times precede the reference time. Similarly, targets of the search may only include (i) still images whose imaging times are after the reference time, or (ii) still images whose imaging times precede the reference time.

Figure 34:
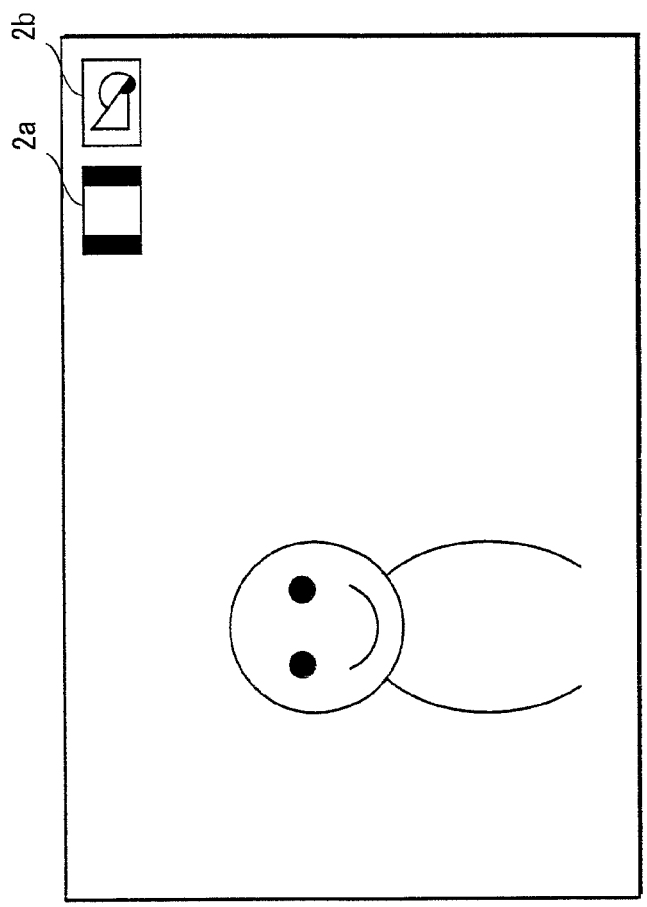
FIG. 34 shows an example of an image to be displayed on the display apparatus of FIGS. 1 and 15 through 17.

(3) The image playback device of the above embodiments may have the following additional functions. The image playback device may, for example, perform the following processing every time the image switch operation is performed, or every predetermined unit of time, or every time the reference time is updated: (i) after searching for videos from the time range Ta, if a posterior video is found from the time range Ta, displaying an icon 2*a* onto the display device, the icon 2*a* indicating that there is a posterior video to which the currently played still image or video can be switched; or (ii) after searching for still images from the time range Tb, if a posterior still image is found from the time range Tb, displaying an icon 2*b* onto the display device, the icon 2*b* indicating that there is a posterior still image to which the currently played still image or video can be switched (FIG. 34). This enables the user to visually acknowledge whether the currently played still image or video can be switched to another still image or video, prior to performing the image switch operation.

(4) The remote control of the above Embodiments 1 through 3 may additionally have, for example, (i) a button for switching to a still image or a video that does not belong to the search time range, (ii) a button for successively playing back still images in forward order, and (iii) a button for successively playing back still images in reverse order. When each of these buttons is held down, the reference time is updated to, for example, the start time of the posterior video or the imaging time of the posterior still image, regardless of which one of (1) through (4) depicted in FIG. 4 the present image switch operation falls into. Note, the switch instruction originating from any of the above buttons is equivalent to "the switch instruction that includes the update sub-instruction (which is an instruction issued by the user to update the reference time)", whereas the switch instruction originating from the image switch button is equivalent to "the switch instruction that does not include the update sub-instruction".

The remote control of the above Embodiment 4 may additionally have, for example, a button for not only switching from playback of a video to playback of a still image, but also updating the reference time to the imaging time of the posterior still image. When this button is held down, the reference time is updated to the imaging time of the posterior still image, even though the present image switch falls into "image switch processing of switching from a video to a still image". Furthermore, the remote control of the above Embodiment 4 may additionally have a button for not only switching from playback of a still image to playback of a video, but also updating the reference time to the start time of the posterior video. When this button is held down, the reference time is updated to the start time of the posterior video. Note, the switch instruction originating from any of the above buttons, the forward button, and the reverse button is equivalent to "the switch instruction that includes the update sub-instruction", whereas the switch instruction originating from the switch/confirmation button or the mode switch button is equivalent to "the switch instruction that does not include the update sub-instruction".

The "the switch instruction that includes the update sub-instruction" and "the switch instruction that does not include the update sub-instruction" are not limited to the switch instructions described above.

(5) According to the above embodiments, a posterior still image or video is selected in accordance with the search result. However, the posterior still image or video may be selected using other methods.

(6) The processing described in the above embodiments may be written as a program that is distributed recorded on a recording medium.

(7) According to the above embodiments, the constituent elements of the image playback device 1, except for the storage device, realize their functions by CPU executing a program. However, these constituent elements may realize their functions in different manners. For example, each of these constituent elements may be constructed as a device that realizes the corresponding function.

(8) The structures of the above embodiments may each be implemented as LSI (large-scale integration), which typically is an integrated circuit. These structures may be integrated as individual chips or as a single chip that includes part of or all of these structures.

Here, depending on the degree of integration, the above LSI may be referred to as IC (integrated circuit), a system LSI, a super LSI, or an ultra LSI.

Also, the integration method is not limited to large-scale integration, and may be realized by a dedicated circuit or a general-purpose processor. Alternatively, FPGA (field programmable gate array) programmable after the LSI has been manufactured, a reconfigurable processor capable of reconfiguring the connections and settings of circuit cells within LSI, or the like, may be employed.

Furthermore, if integration technology that replaces large-scale integration becomes available as a result of advances in semiconductor technology or the advent of derivative technology, the integration of the functional blocks and components may naturally be performed using this technology. The application of biotechnology or the like in this area is also a possibility.

INDUSTRIAL APPLICABILITY

The present invention is applicable to multi-angle playback of videos and still images.

The invention claimed is:

1. An image playback device comprising:
a storage unit for storing (i) a plurality of videos and a plurality of still images, and (ii) for each video and each still image, an image information piece including an imaging time at which the video or the still image was taken;
a playback control unit operable to playback each video and each still image;
a time management unit operable to manage a reference time in accordance with the playback performed by the playback control unit and the imaging times at which the videos and the still images are taken;
a reception unit operable to receive, from a user, a switch instruction that causes an image switch to be performed; and
a search unit operable to, when the reception unit receives the switch instruction, perform at least one of the following (i) and (ii) with reference to the image information pieces: (i) searching for, from among the videos stored in the storage unit that are not currently being played back, a video that meets at least part of a video search time range that includes the reference time, such that $t2<t1<t3$, where $t2$ does not equal $t3$, where $t1$ is the reference time, where $t2$ represents a time point that is older than $t1$, and where $t3$ represents a time point that is more recent than $t1$: and (ii) searching for, from among the stored still images, a still image having an imaging time that is within an image search time range that includes the reference time, such that $t4<t1<t5$, where $t4$ does not equal $t5$, where $t1$ is the reference time, where $t4$ represents a time point that is older than $t1$ and where $t5$ represents a time point that is more recent than $t1$, wherein
the playback control unit performs the playback in accordance with a result of the search performed by the search unit.

2. The image playback device of claim 1, wherein, when the image switch is performed by the playback control unit and when the image switch is a switch from the playback of one of the videos to the playback of one of the still images, the time management unit leaves the reference time unchanged.

3. The image playback device of claim 1, wherein, when the image switch is performed by the playback control unit and when the image switch is a switch from the playback of one of the still images to the playback of another one of the still images, the time management unit leaves the reference time unchanged.

4. The image playback device of claim 1, wherein, when the image switch is performed by the playback control unit and when the image switch is a switch from the playback of one of the still images to the playback of one of the videos, the playback control unit plays back the one of the videos from the reference time managed by the time management unit.

5. The image playback device of claim 1, wherein, when the image switch is performed by the playback control unit and when the image switch is a switch from the playback of one of the videos to the playback of one of the still images, the time management unit (i) leaves the reference time unchanged in a case where the switch instruction does not include an update sub-instruction, and (ii) updates the reference time to the imaging time of the one of the still images in a case where the switch instruction includes the update sub-instruction, the update sub-instruction being an instruction issued by the user to update the reference time.

6. The image playback device of claim 1, wherein, when the image switch is performed by the playback control unit and when the image switch is a switch from the playback of one of the still images to the playback of another one of the still images, the time management unit (i) leaves the reference time unchanged in a case where the switch instruction does not include an update sub-instruction, and (ii) updates the reference time to the imaging time of the other one of the still images in a case where the switch instruction includes the update sub-instruction, the update sub-instruction being an instruction issued by the user to update the reference time.

7. The image playback device of claim 1, wherein
the image search time range includes (i) a first time sub-range that precedes the reference time and (ii) a second time sub-range that follows the reference time, and
the first and second time sub-ranges of the image search time range are different from each other in length.

8. The image playback device of claim 7, wherein the still image search time range is defined such that a time range following the reference time extends longer than a time range preceding the reference time.

9. The image playback device of claim 1, wherein
the video search time range includes (i) a first time sub-range that precedes the reference time and (ii) a second time sub-range that follows the reference time, and
the first and second time sub-ranges of the video search time range are different from each other in length.

10. The image playback device of claim 9, wherein the video search time range is defined such that a time range following the reference time extends longer than a time range preceding the reference time.

11. The image playback device of claim 1, wherein the image search time range and the video search time range are different from each other in length.

12. The image playback device of claim 11, wherein the still image search time range extends longer than the video search time range.

13. The image playback device of claim 1, further comprising
an interface unit operable to connect to an external device storing (i) a plurality of other videos and a plurality of other still images, and (ii) for each of the other videos and the other still images, an image information piece including an imaging time at which the other video or the other still image was taken, wherein
the video that meets the at least part of the video search time range is searched for from among the videos stored in the storage unit and the other videos stored in the external device, and
the still image having the imaging time that is within the image search time range is searched for from among the still images stored in the storage unit and the other still images stored in the external device.

14. The image playback device of claim 1, wherein the playback control unit performs exception processing when the search unit does not find one of the videos and the still images for the image switch.

15. The image playback device of claim 14, wherein the exception processing displays, onto a display device, a notification indicating that there are no still images for the image switch.

16. The image playback device of claim 14, wherein the exception processing displays, onto the display device, a notification indicating that the image switch is to a still image having an imaging time that is not included in the still image time range, and, once the user performs a confirmation, switches to, a still image having an imaging time that is closest to the reference time among the still images having imaging times that are not included in the still image time range.

17. The image playback device of claim 1, wherein the playback control unit displays an icon indicating that a display device is ready to switch to another image when an image for the image switch is found.

18. An image playback method of using an image playback device, the image playback method comprising:
a playback step of playing back, via the image playback device, a plurality of videos and a plurality of still images, the plurality of videos and the plurality of still images being stored in a storage unit of the image playback device, each video and each still image being stored in one-to-one correspondence with an image information piece of a plurality of image information pieces, and each image information piece including an imaging time at which the corresponding video or the corresponding still image was taken;
a time management step of managing a reference time in accordance with the playback performed in the playback step and the imaging times at which the videos and the still images are taken;
a reception step of receiving, from a user, a switch instruction that causes an image switch to be performed;
a search step of, when the switch instruction is received in the receiving step, performing at least one of the following (i) and (ii) with reference to the image information pieces: (i) searching for, from among the videos stored in the storage unit that are not currently being played back, a video that meets at least part of a video search time range that includes the reference time, such that t2<t1<t3, where t2 does not equal t3, where t2 is the reference time, where t2 represents a time point that is older than t1, and where t3 represents a time point that is more recent than t1: and (ii) searching for, from among the stored still images, a still image having an imaging time that is within an image search time range that includes the reference time, such that t4<t1<t5, where t4 does not equal t5 where t1 is the reference time, where t4 represents a time point that is older than t1 and where t5 represents a time point that is more recent than t1; and
playback control step of controlling the playback in accordance with a result of the search performed in the search step.

19. A non-transitory computer-readable recording medium having an image playback program recorded thereon, the image playback program causing a computer to execute a method comprising:
a playback step of playing back a plurality of videos and a plurality of still images, the plurality of videos and the plurality of still images being stored in a storage unit, each video and each still image being stored in one-toone correspondence with an image information piece of a plurality of image information pieces, and each image information piece including an imaging time at which the corresponding video or the corresponding still image was taken;

a time management step of managing a reference time in accordance with the playback performed in the playback step and the imaging times at which the videos and the still images are taken;

a reception step of receiving, from a user, a switch instruction that causes an image switch to be performed;

a search step of, when the switch instruction is received in the receiving step, performing at least one of the following (i) and (ii) with reference to the image information pieces: (i) searching for, from among the videos stored in the storage unit that are not currently being played back, a video that meets at least part of a video search time range that includes the reference time, such that t2<t1<t3, where t2 does not equal t3, where t1 is the reference time, where t2 represents a time point that is older than t1 and where t3 represents a time point that is more recent than t1; and (ii) searching for, from among the stored still images, a still image having an imaging time that is within an image search time range that includes the reference time, such that t4<t1<t5, where t4 does not equal t5, where t1 is the reference time, where t4 represents a time point that is older than t1 and where t5 represents a time point that is more recent than t1; and playback control step of controlling the playback in accordance with a result of the search performed in the search step.

* * * * *